Robert E. Mumma
Inventor
By Carl Benst
His Attorney

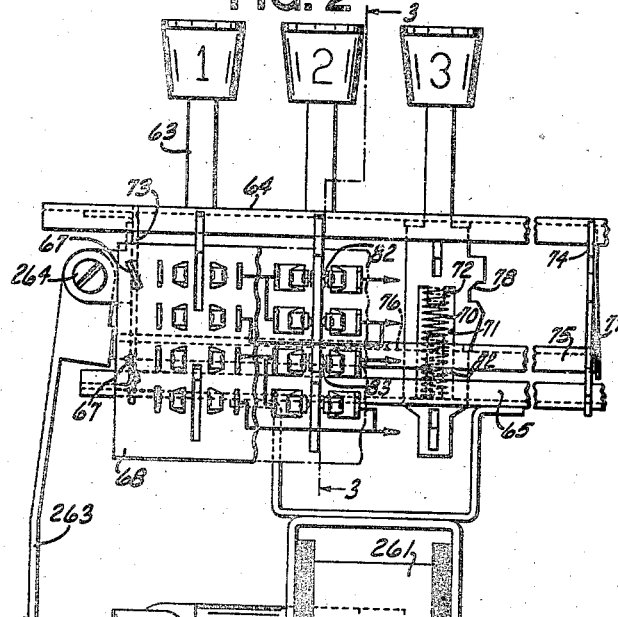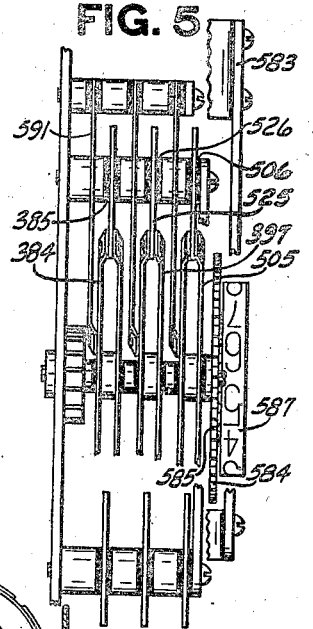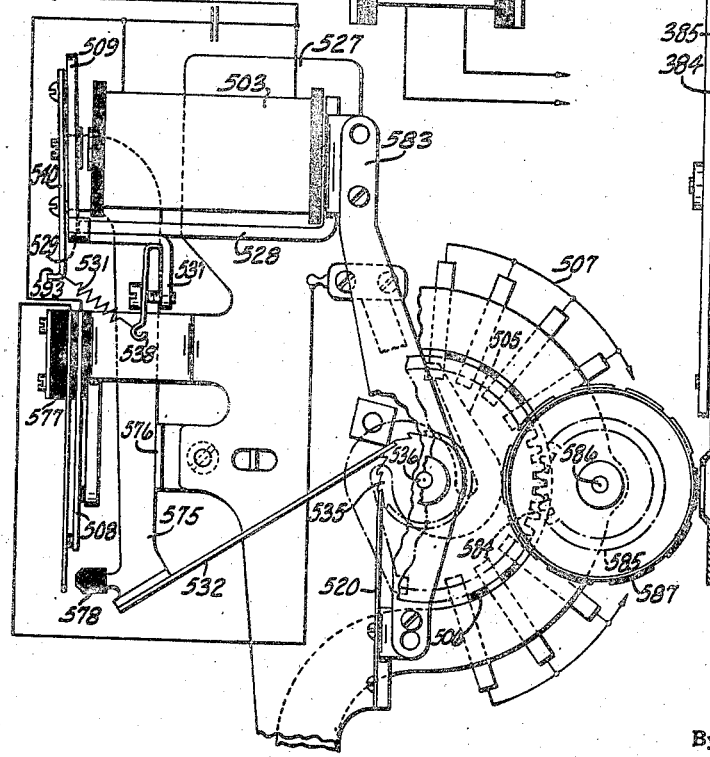
July 23, 1946.      R. E. MUMMA      2,404,739
CALCULATING MACHINE
Filed July 18, 1940      11 Sheets-Sheet 2
FIG. 2
FIG. 3
FIG. 4
FIG. 5
Robert E. Mumma
Inventor
By *Carl Beust*
His Attorney

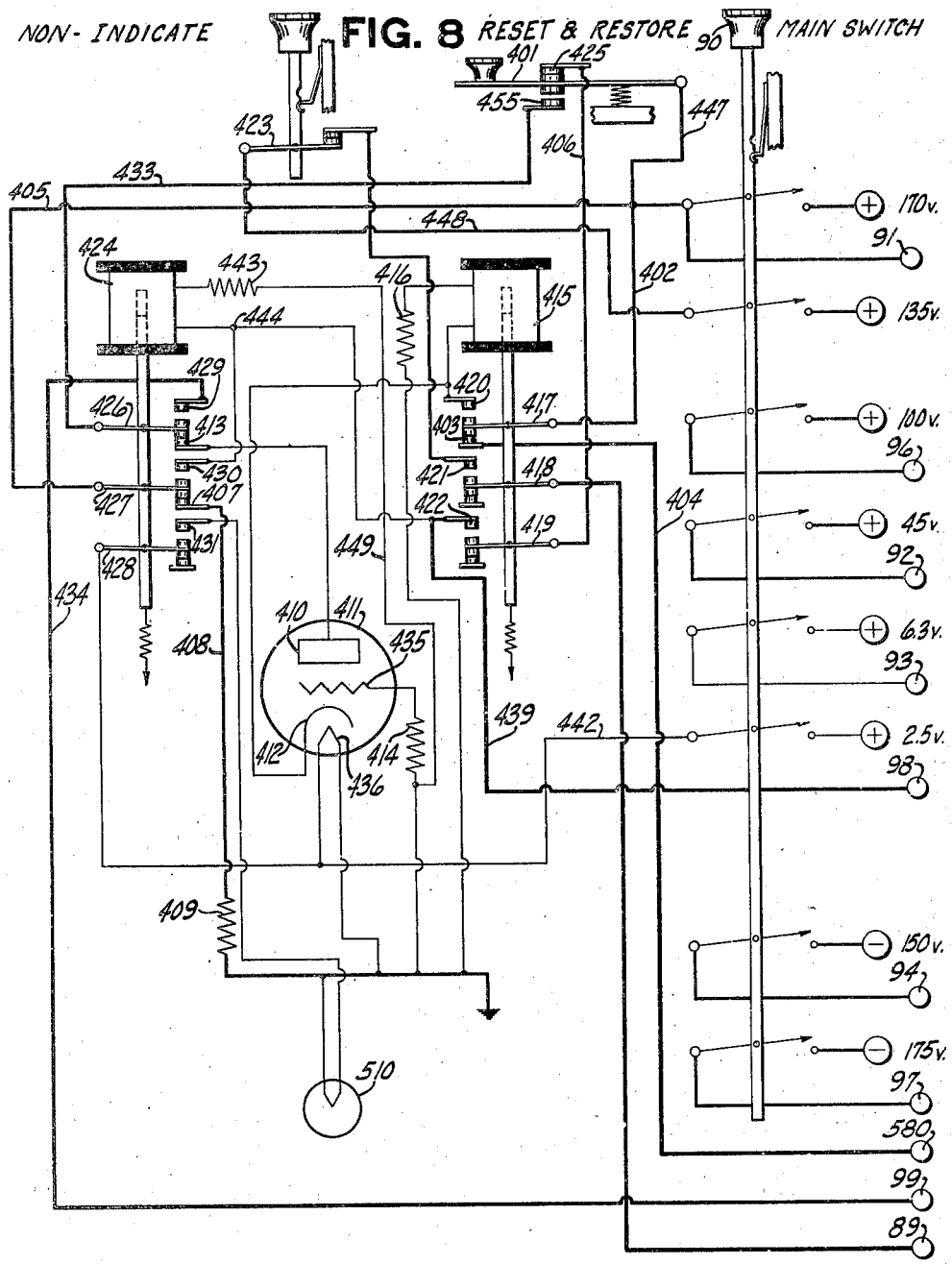

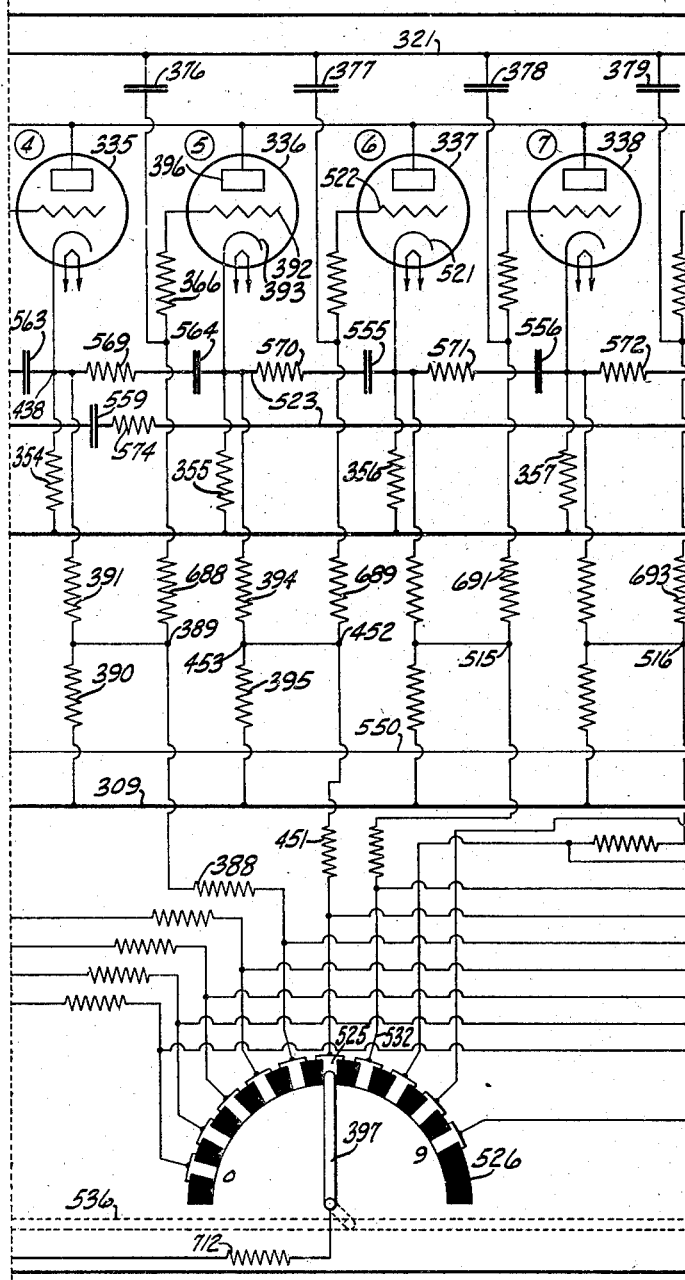

July 23, 1946.  R. E. MUMMA  2,404,739
CALCULATING MACHINE
Filed July 18, 1940  11 Sheets-Sheet 8

Robert E. Mumma
Inventor
By Carl Beust
His Attorney

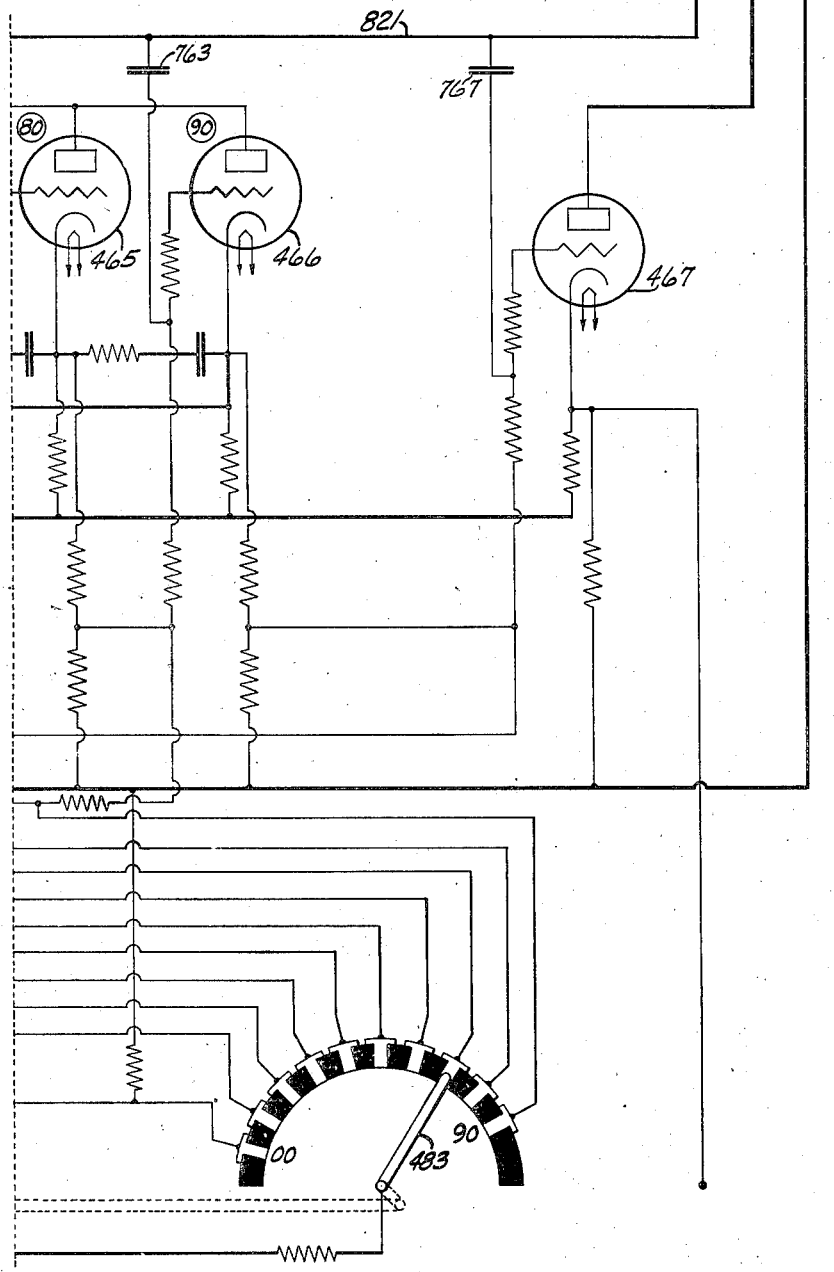

Patented July 23, 1946

2,404,739

UNITED STATES PATENT OFFICE 2,404,739

CALCULATING MACHINE

Robert E. Mumma, Dayton, Ohio, assignor to The National Cash Register Company, Dayton, Ohio, a corporation of Maryland Application July 18, 1940, Serial No. 346,087

3 Claims. (Cl. 315—323)

This invention relates to calculating machines and more particularly relates to an electro-mechanical calculating machine having a differential actuator and an accumulator that function solely by the flow of electric energy without mechanical movement of the parts.

In such a machine, as herein fully disclosed and as previously disclosed in the application for United States Letters Patent filed by Joseph R. Desch and this applicant, Robert E. Mumma, on March 20, 1940, and bearing Serial Number 325,040, selected numerical data is entered, by means of an electronic differential actuator, into an accumulator comprising a plurality of denominationally grouped electronic devices, the selective operation of which devices during a plurality of data-entering operations causes the accumulation of data.

The actuation of the accumulator by the differential is caused by electric impulses which issue from the differential and which are received by the accumulator.

An object of this invention is to provide, between such a differential actuator and its associated accumulator, a relay for causing the differential impulses to be transformed into stronger impulses of identical character as those delivered from the differential actuator.

Another object of the invention is to provide a gas discharge electron tube between such a differential actuator and its associated accumulator, the electric impulses issuing from the differential actuator causing with each impulse a discharge in the electron tube, whereby the changes of potential of an electrode of such tube may be utilized to actuate the accumulator.

Another object of the invention is to provide circuits whereby such an electron tube is self-extinguishing, so that it may be fired rapidly in response to each of a plurality of incoming signals.

With these and incidental objects in view, the invention includes certain novel features of construction and combination of parts, the essential elements of which are set forth in appended claims and a preferred form or embodiment of which is hereinafter described with reference to the drawings which accompany and form a part of this specification.

Of said drawings:

Fig. 2 is an elevation of a typical key bank, partly broken away.

Fig. 3 is a cross section through the key bank of Fig. 2 on the line 3—3.

Fig. 4 is a side elevation of the step-by-step operating magnet for one denomination of the indicator, the accumulator sensing means driven thereby, and the indicator set in accordance therewith.

Fig. 5 is a section through part of the commutator and wiper arm assembly of the accumulator sensing means shown in Fig. 4.

Fig. 8 is a wiring diagram of the main switch and the manually-operated control circuits for non-indicating, resetting, and restoring operations.

Figure 9A:
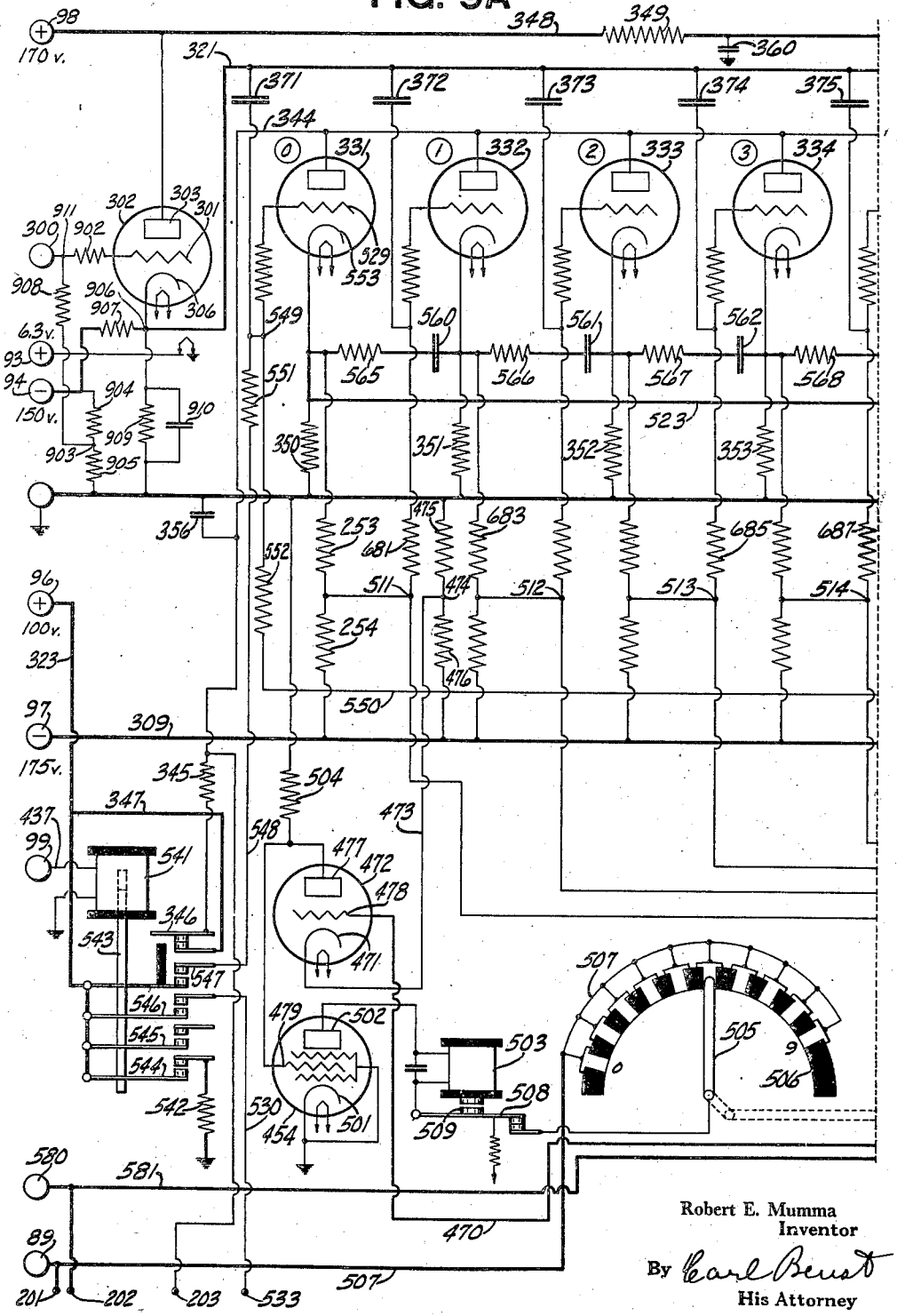
Figure 9C:
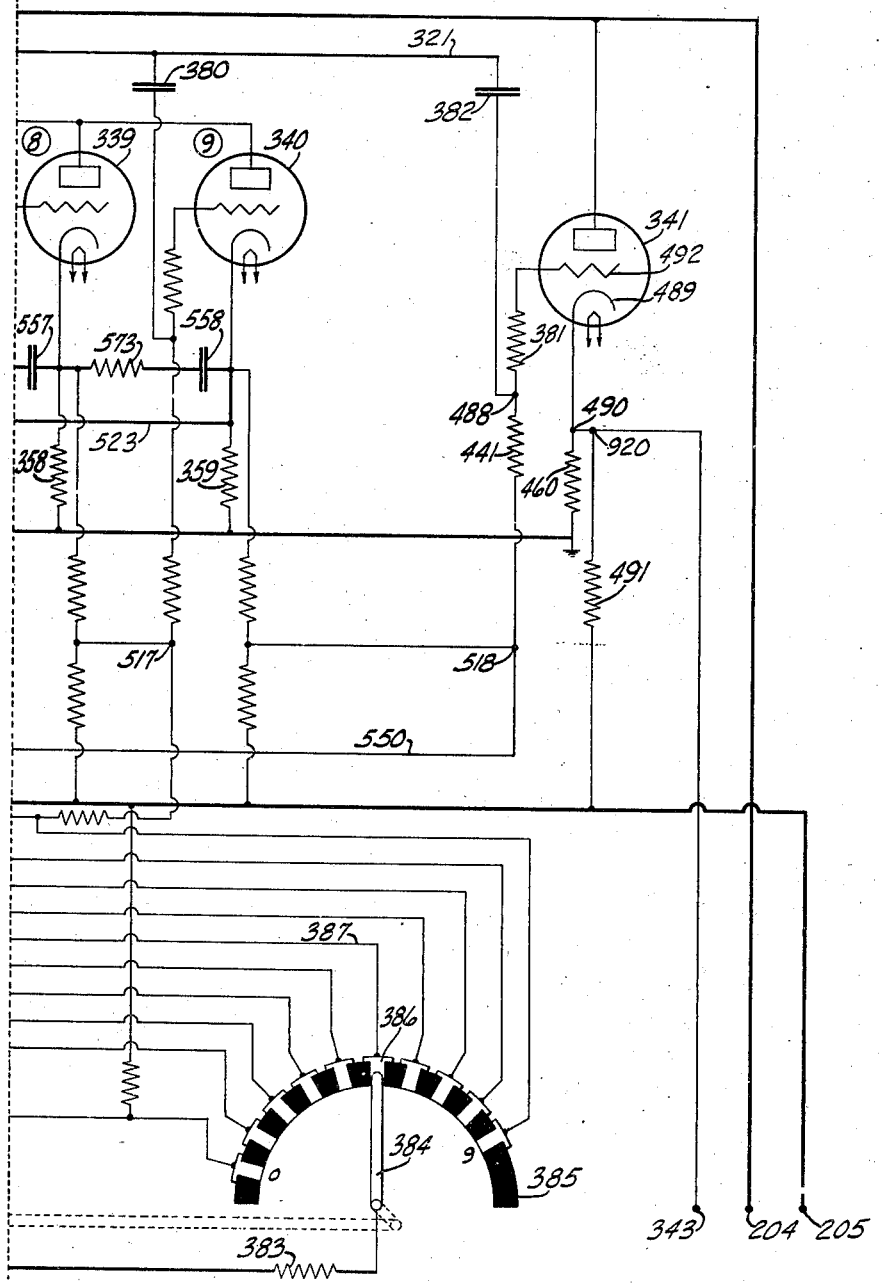

Figs. 9A, 9B, and 9C, taken together, form a wiring diagram of the units denomination of the accumulator.

Figure 10A:
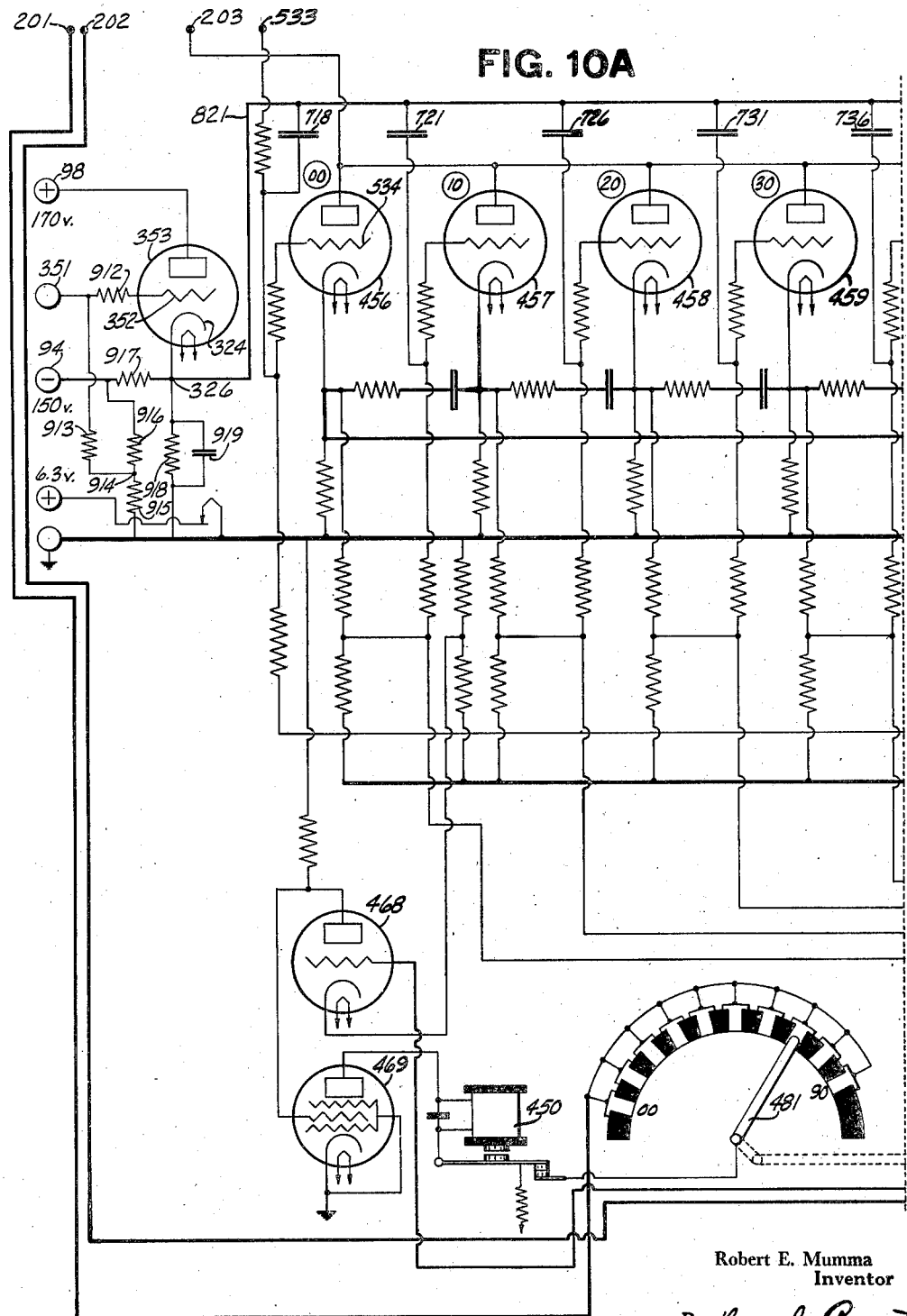
Figure 10B:
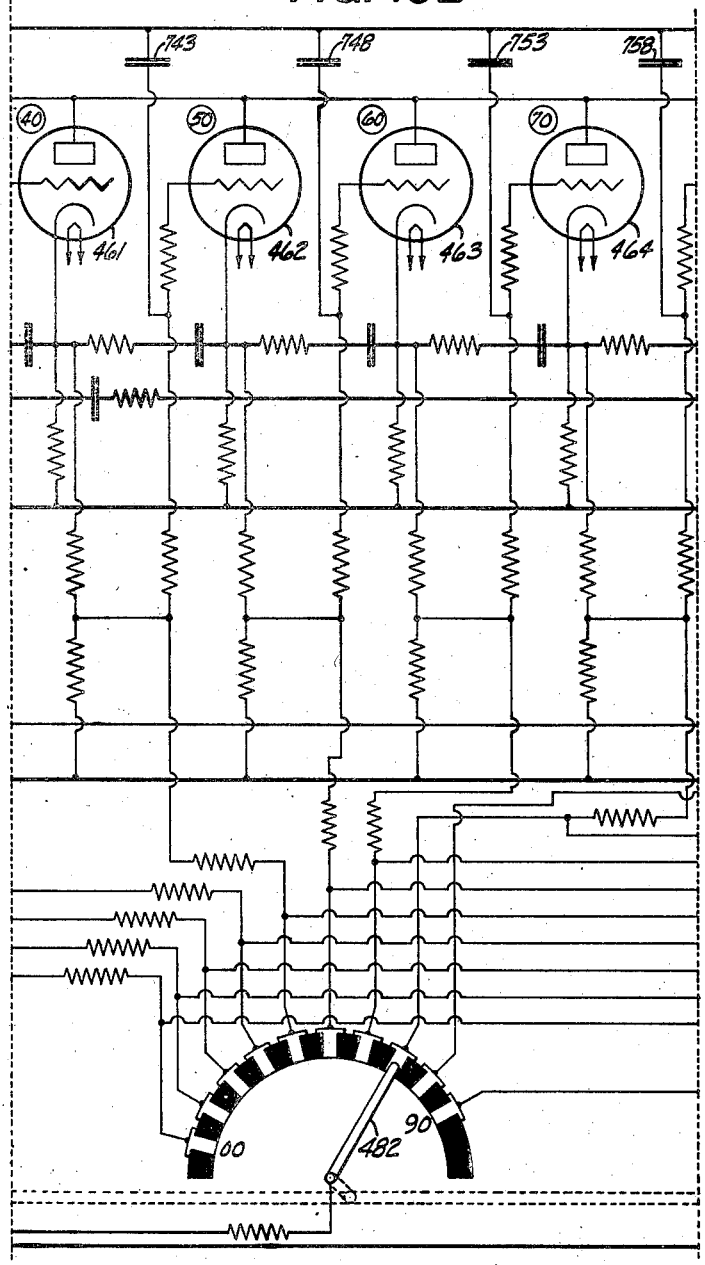

Figs. 10A, 10B, and 10C, taken together, form a wiring diagram of the tens denomination of the accumulator.

General description

The machine embodying the invention may be conveniently considered by sections which are functionally comparable to the key banks, differential actuator, accumulator, and visual indicator of a purely mechanical calculating machine. The relation of these sections, as regards their function, is shown diagrammatically in Fig. 1.

The disclosed machine has a keyboard of two denominations of nine keys each, representing the units and the tens denominational orders of the decimal system of numbers. These key banks may have set thereon any number from 1 to 99 for entry into the machine in one operation. The differential actuator having units and tens denominational orders corresponding to the keyboard, each of which denominational orders acts under control of its associated key bank to enter data into the accumulator, is purely electrical, having no moving parts except for the key release and the "single operation" control cooperating therewith. The accumulator is purely an electrical device and has, in addition to the units and tens denominational orders represented on the keyboard, a hundreds or overflow denomination. The accumulator includes a purely electric means associated with each denominational order of the accumulator for transferring carry-overs from one denomination to the next higher denomination. The visual indicator is set by an electro-mechanical sensing means for each denomination, which means sense and are controlled by the data-representing electrical condition of the associated denominational order of the accumulator. The principle embodied in the disclosure can be expanded indefinitely in respect to the number of key bank controlled denominations and in respect to the number of overflow denominations and their associated indicator units. The drawings disclose this sectional plan of construction of the machine. Certain controls dealing with special operations, the key release mechanism, and the sensing and the indicating devices are the only mechanically moving elements in the machine. While the drawings show only two denominational orders in the keyboard and three in the accumulator and in the indicator, as many additional denominational orders may be used as desired.

After the keys have been manually set and a starting switch 100 (Figs. 1, 6, and 7) has been closed, the data is entered into the accumulator with a speed limited only by ordinary electrical circuit characteristics, such as resistance, capacity, inductance, and ionization time, and is not limited by the physical movement of any mechanical part. Data may be entered into the accumulator many times faster than it takes to set up the data manually on a keyboard and to close the starting switch. An approximate time may be computed for the entry of data into such an accumulator if the circuit characteristics are known. In the circuit to be described, the circuit element values are given as typical. In the particular embodiment based on these values, the longest time required to enter data of two denominational digits, after closing the starting switch, is approximately .0022 second, being the time required to enter the number "99," which is longer than the time required to enter the number "10."

It is within the purview of this invention to use any of the well-known means for controlling the entry of data, other than the manual keyboard described herein; for instance, the switching of the differential actuator circuits may be controlled by any of the well-known methods for sensing data such as that represented on record materials by perforations, light-controlling areas, electrically-conductive areas, or magnetized areas. The key bank control is used in this embodiment as one example of differential circuit-switching means.

The electro-mechanical sensing and indicating means is constantly ready to indicate new totals as new data is entered and is relatively slow in operating compared with the time taken to make an entry of data into the accumulator, yet it will follow the operation of the accumulator and ultimately indicate the amount finally stored in the accumulator, as it is not positively connected to the accumulator, but merely explores its electrical condition until the amount finally stored in the accumulator is sensed, and then stops. If the amount changes, the exploring commences again. The indicator is mechanically attached to and shows the position of the exploring means at any time.

Figure 1:
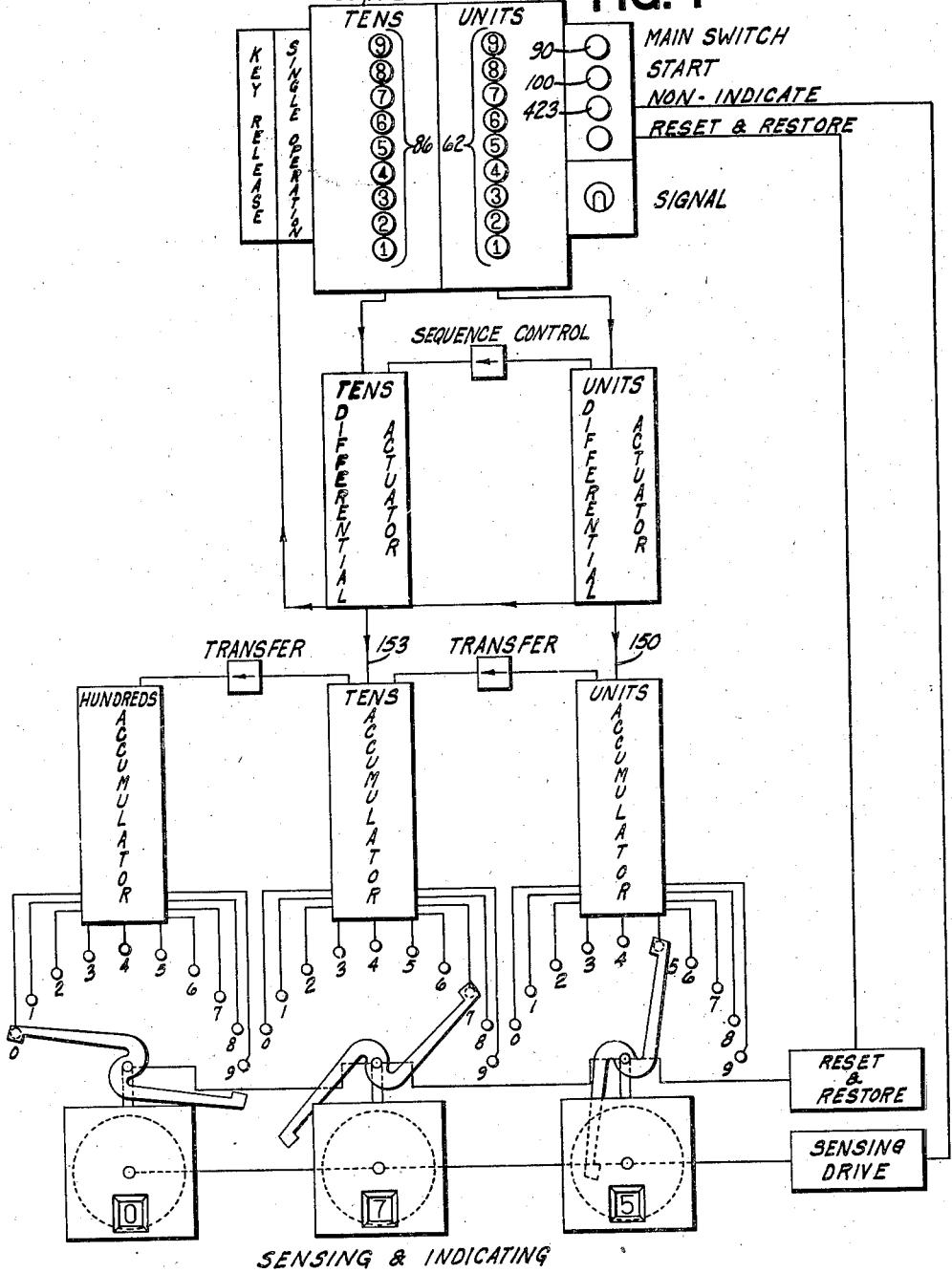
Fig. 1 is a diagrammatic chart explanatory of the functional relation between the several units of the machine.
Figure 6:
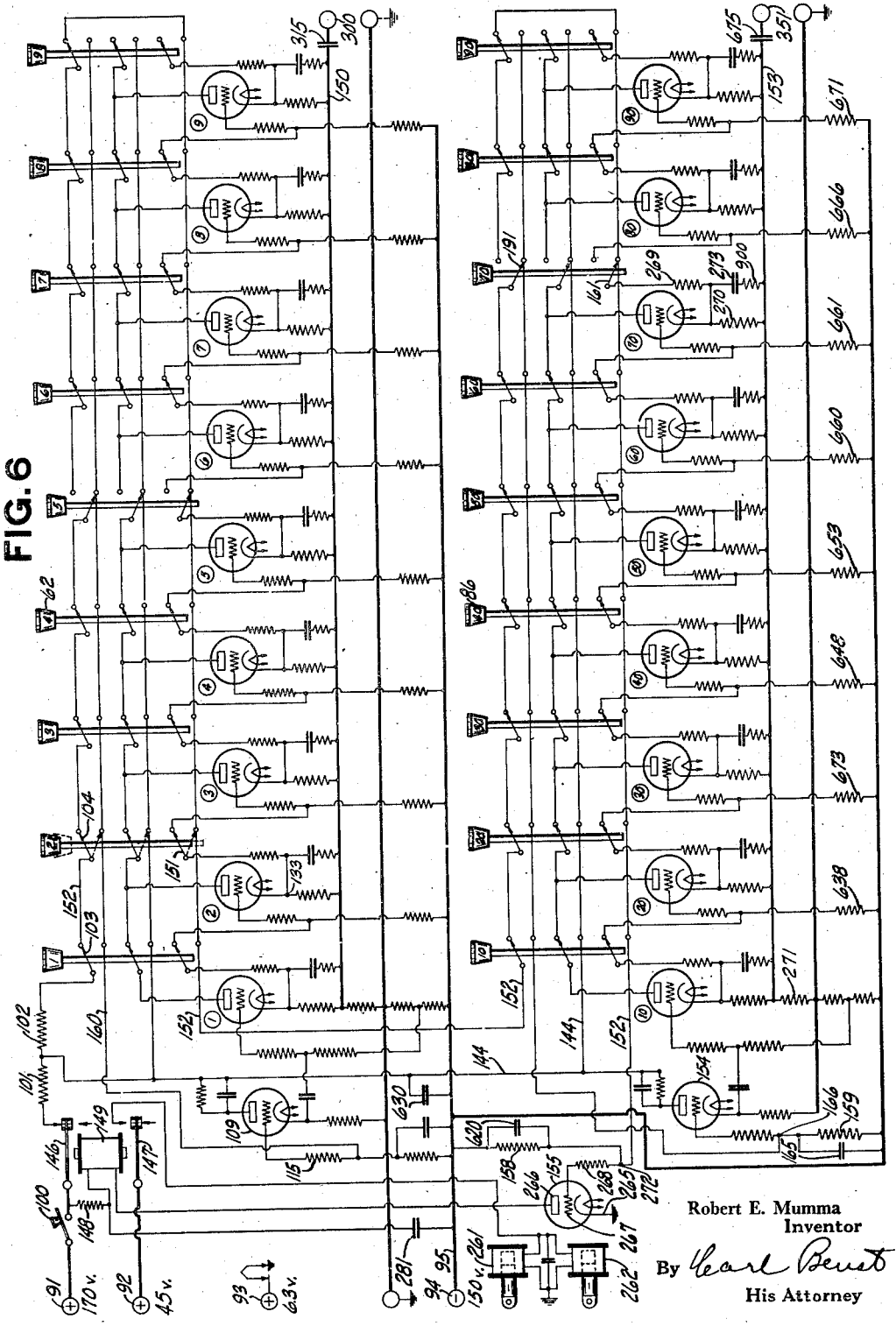
Fig. 6 is a wiring diagram of two denominational orders of the differential actuator.

The differential actuator (Figs. 1 and 6) is composed of a group of ten grid-controlled gaseous electron discharge tubes for each denominational order. The ten tubes in each denominational order consist of a "starting" tube and nine tubes representing the nine digits 1, 2, 3, 4, 5, 6, 7, 8, and 9. These tubes are arranged in a circuit whereby, commencing with the starting tube, they may be fired and rendered electrically conductive one at a time in sequence, one tube being fired by the conditions occurring during the starting of conduction in the next lower tube, which lower tube itself is extinguished as the next tube in the series is rendered conductive. The starting tube in a denominational series is fired by closing the starting switch 100 (Figs. 1 and 6) to commence the automatic sequential operation. The firing of the starting tube fires the "1" tube, and the firing of the "1" tube fires the "2" tube. The firing of the "2" tube fires the "3" tube and extinguishes the "1" tube. This process continues until the tube representing the depressed key is reached, which tube, upon being fired, cannot fire the tube having the next higher digit value, as the anode-energizing circuit of the tube having the next higher digit value is broken by a switch operated by the depressed key. The firing of each tube in a denominational series, except the starting tube, impresses an electric potential impulse upon an output conductor common to all the digit-representing tubes of the denomination. There is one output conductor for each denominational order of the actuator, and each output conductor is connected to the corresponding denominational order of the accumulator, as indicated by reference numbers 150 and 153 (Figs. 1 and 6). The number of impulses impressed on each denominational output conductor in a given operation is equal to the value of the depressed key in that denomination.

The denominational groups of the differential actuator are themselves operated sequentially, the firing of the tubes of the group in the units denominational order being completed before the firing of the tubes in the group in the tens denominational order commences, or vice versa, if desired, as will be explained. Timing elements have been provided in each group of tubes of the differential actuator, which elements are operable, when the lower denominations are operated first in the sequence, to give a slight pause before the sequential firing of the next higher denominational group of tubes commences, to permit denominational carry-overs to be made to that denomination of the accumulator without interference with the entry of the differential data. The electric potential impulses, as they occur in the respective output conductors from the differential, actuate their respective accumulator orders, each impulse being so timed as to be received by the accumulator before the next impulse is produced.

The accumulator consists of the three denominational orders, units, tens, and hundreds. Each denominational order of the accumulator consists of ten tubes representing the digits 0, 1, 2, 3, 4, 5, 6, 7, 8, and 9, which are arranged in a circuit so that they are fired one at a time in endless chain sequence, either by the impulses sent through the output conductor of its associated differential actuator or by impulses produced by the transfer device, with the exception of the overflow denomination, which is actuated only by the impulses from the transfer device of the next lower denominational order. The carry-overs from one denomination to the other are made by having an extra electric impulse introduced in the next higher denominational order upon the entry of an impulse in the lower order after any "9" digit-representing tube has been fired in that lower order, said impulse in the lower order also having its regular function of firing the "0" or zero tube in the lower order. Inasmuch as the denominational groups of tubes of the differential actuator are fired in sequence, the accumulator orders are added into in the same sequence. In the circuits as disclosed, the pause between operations of the different groups of tubes of the actuator is provided for the purpose of allowing the denominational carry-over impulse, if any, to actuate the next denomination of the accumulator before impulses from the differential actuate it. Such interference between carry-over impulses and differential impulses may be rendered impossible by entering the data into the higher denominational order before entering it into the next lower denominational order, which is done by arranging for the highest order of the differential actuator to be operated first. This may be accomplished by renumbering the units keys (Fig. 1) as tens keys (Fig. 11) and renumbering the tens keys as units keys and having output conductor 150 lead to the tens bank input terminal of the accumulator and having the conductor 153 lead to the units bank input terminal of the accumulator.

The accumulator, after having data entered therein, has one tube in each denomination remaining in a conductive state, said tube representing the units digit corresponding to the accumulated data of that denomination. Subsequent entries of data into a denomination cause a continuation of the sequential chain firing of the tubes, beginning with the tube having the next higher digit value to the conductive tube. Thus, the accumulator differs from the actuator, which has no tube conductive between data-entering operations. The firing of the tubes in the differential actuator is self-timed, whereas the firing of the tubes in the accumulator is timed by the impulses from the differential actuator.

A sensing means is provided for each denominational order of the accumulator, the "zero" tube in each denominational order of the accumulator being especially provided to be sensed in case no other tube of the denomination is conductive, making it possible to sense the zero or cleared condition of a denomination in a positive manner. The normally operative sensing means of each denomination explores the condition of the accumulator tubes through electrically-connected contacts, one by one, until a conductive tube is located, whereupon the operation of the sensing means is made to cease and the number which that tube represents is thereby made visible by a number wheel set in accordance with the position of the then stationary sensing means. The sensing means has exploring or wiper arms representing a denomination, which arms are always conditioned to move over the sensing contacts until a conductive tube is sensed in the particular denomination. If the wiper arm is stationary on the contact related to a conductive tube and the tube is extinguished by the entry of data into the accumulator, the exploring movement of the wiper arm will commence and continue until the new contact representing the new accumulation is found.

The accumulator is cleared or set to zero by extinguishing all the tubes and subsequently firing the zero tubes in each denomination. The sensing means then resume their exploring operation and stop at zero in each denomination, because those tubes are now conductive.

If the main supply of electric current be switched off by main switch 90 (Figs. 1 and 8), deenergizing the accumulator and the sensing means before resetting the accumulator to zero, the indicator will still have set thereon the last amount in the accumulator. The accumulator electron tubes, being deprived of current, will have no tube conductive and therefore will have no data therein. Under these conditions, in the event the main supply of current is again turned on by closing switch 90, the accumulator is caused, by the flow of energy through the wiper arms, to render the proper tubes conductive in accord with the data on the indicator. This restoring of data into the accumulator is accomplished automatically, as will be explained.

A non-indicate key switch 423 (Figs. 1 and 8) has been provided so that the accumulator may be operated without the indicator functioning. If the switch 423 is closed after data-entering operations, the indicator will be set in accordance with the accumulated data.

The action of the grid-controlled gaseous discharge electron tubes used in the differential actuator and accumulator is well known. An electric potential of sufficient magnitude impressed between a cathode and an anode in a gas-filled envelope is controlled by an intervening grid element which is normally provided with a negative bias potential with relation to the cathode so as to prevent the flow of electrons to the anode. If the biasing grid potential is reduced to a point where it is no longer in control of the emission of electrons from the cathode, current will flow at once through the tube from the cathode to the anode and in so doing will ionize the inert gas within the tube. The ionization of the gas within the tube causes an increase in the flow of electrons from the cathode to the anode and renders the grid incapable of further blocking the electric flow. This flow, once started, will continue even though the grid be restored to its normal bias potential and will not cease until the cathode-anode current is interrupted by some other means. When the gas in the tube is ionized and the electron flow has started, the tube is said to have been fired, or rendered conductive. The conductive tube may be extinguished, or rendered non-conductive, either by adjusting the cathode capacity and resistance so that for an instant, as the capacitors are charging, there is no flow of current from the cathode, or by shutting off the potential completely. Under these conditions the grid, if at normal bias potential, resumes control. Both of these phenomena are used in the disclosed machine, as will be explained. Ordinarily the bias potential of the grid with relation to the cathode is not kept at a hair-trigger point, but at a substantial bias, thus rendering the tube more stable and unresponsive to slight fluctuations of potential of the grid.

The automatic sequential firing of the tubes in the differential actuator is accomplished by placing a high resistance in the cathode supply circuit, which causes an abrupt positive rise in potential of the cathode of a tube as it fires, and this abrupt rise in potential is utilized to extinguish the tube of next lower digit value in the series by temporarily raising its cathode potential above the potential of the anode, and, by the same positive potential rise, to destroy the grid control of the tube having the next higher digit value, causing it to fire unless it be cut out by switch means operated by the keys.

In the accumulator, the same phenomenon—the rise in potential of the cathode when the tube fires, caused by placing a high resistance in the cathode supply—is used to extinguish the tube having the next lower digit value in the series, as is the case with the differential actuator, and to weaken the grid control of the tube having the next higher digit value by reducing its bias to the trigger point, so that the next potential impulse from the differential actuator, which impulses are common to all the tubes of the accumulator, will cause only the tube with the weakened grid bias to fire. More detailed explanation will be given on this subject as the accumulator is described more particularly.

The digit keys, by operating switches, control the stopping of the firing of the tubes in each of the differential groups after predetermined numbers of tubes have been fired. As each tube is fired, it produces, by the rise in its cathode potential, an electric impulse in a conductor common to all the differential actuator tubes in the denomination, which impulse is conveyed to the corresponding order of the accumulator, which causes the firing of the tube next in numerical order. Thus, except for the release of the keys after the entry of data and except for the means to prevent a repeat entry while the keys are still depressed, there are no movements of mass involved in data-entering operations except the mass of electrons and ions causing the electric current. The only factors which limit the speed of the entry of data are electrical in nature and are placed in the circuit for the proper timing of the impulses and their actuated elements.

The speed of the actual entry of data into the accumulator is so extremely rapid that the time of making such an entry is negligible in comparison with the duration of the manual movements necessary to press the starting key. The time lapse between the pressing of the starting button and the consequent firing of the tubes in the differential actuator and the accumulator may be as short as .001 second for the entry of a single digit. From this it will be apparent that the speed of making an entry into the accumulator is extremely fast in comparison to the speed with which the data may be set up either by manual keys as shown in this embodiment or by other more rapid data-entry control means such as mechanically-sensed, electrically-sensed, or light-sensed records, which data-entry control means have been mentioned as within the purview of the disclosure.

The diagrammatic representation shown in Fig. 1 illustrates the denominational groups in the differential actuator, the accumulator, and the indicator. These groups may be added to as desired. There may be more than one overflow denomination, if desired, but there must be one accumulator order for each denomination of the differential actuator and one indicator for each denomination of the accumulator.

The principle of the invention for this disclosure is embodied in a machine having certain electric supply potentials and electronic devices of certain electrical characteristics. In balancing the circuits, adjusted resistors and capacitors are used. Electronic devices or potentials of different characteristics may be used without departing from the principle disclosed by this invention, merely by using different values of resistance and capacity.

The keyboard

The keyboard consists of a units denomination key bank 61 (Fig. 1) having nine digit keys 62 (Figs. 1, 2, 3, and 6) and a tens denomination key bank 63 having nine digit keys 86 (Figs. 1 and 6). The keys in each bank are of similar construction, and a description of the keys in one bank will be sufficient for an understanding of all the keys.

Each key has a stem 66 (Figs. 2 and 3) slidably mounted in alined holes in a top plate 64 and a bottom plate 65 of a unitary key bank, said plates being spaced and fastened together by transverse vertical webs 73 and 74 (Fig. 2), each of which has laterally projecting ears 67 to engage side plate members 68 and 69 (see also Fig. 3) of the key bank. Each key is provided with a restoring spring 70 (Fig. 2), which engages the bottom plate 65 and is contained in a slot 71 in the key stem, where it is retained by projections 72. As a key is depressed, the spring compresses against the bottom plate 65, giving the key an upward restoring urge. The keys are limited in their upward motion by a shoulder on the key stem 66 striking the top plate 64. A key locking plate 75 (Figs. 2 and 3), having celarance holes 76 for each key stem, is slidably mounted in clearance holes in the webs 73 and 74. The locking plate 75 is urged to the left, as shown in Fig. 2, by spring 77 until the edges of the key clearance slots contact the key stems. As a key is depressed, the locking plate is forced to the right by a camming surface on the key stem until notch 78 allows the locking plate to move to the left, locking the key in depressed position. By chamfering each of the notch edges, the action of the key bank is made flexible, causing any depressed keys in the bank to be restored when another key in the bank is depressed. Each key stem has inserted therein an insulating web formed of two pieces 79 and 80 (Fig. 3) having ears projecting into slots in the key stems 66 and into guiding slots 81 in the side plate members 68 and 69, so that the insulating web pieces slide up and down with the keys. On each web are four contacts 82, 83, 84, and 85 (Figs. 2 and 3), each of which contacts in the up position can close a circuit between one pair of switch points and in the down position can close a circuit between another pair of switch points. These switch points are supported by the side plate members 68 and 69. Therefore, by the depression of a key, four circuits may be broken and four circuits may be closed. The invention uses but three of these four available switches, the description of this key bank being given to illustrate one way in which multiple switching may be accomplished by a single key. A key release solenoid 261 for the units bank of keys (Figs. 2 and 6), when energized, moves lever 263 counter-clockwise, around pin 264, to move the locking plate 75 to the right and release a depressed key. A similar solenoid 262 causes the release of any depressed key in the tens bank of keys. There is one gas-filled electron tube 155 (Fig. 6) for controlling the operation of both solenoids 261 and 262. The control tube 155, when fired, energizes a solenoid 149 to close the normally open switch 147, which supplies the grounded solenoids 261 and 262 with 45 volts positive potential, causing these solenoids to become energized and operate their armatures and thus release any depressed digit keys.

The circuits entering into the operation of the control tube 155 will now be considered.

As the main switch 90 (Figs. 1 and 8) is closed, terminals 91, 92, 93, and 94 are impressed with the following electrical potentials: 170 volts positive, 45 volts positive, 6.3 volts positive, and 150 volts negative.

Figure 7:
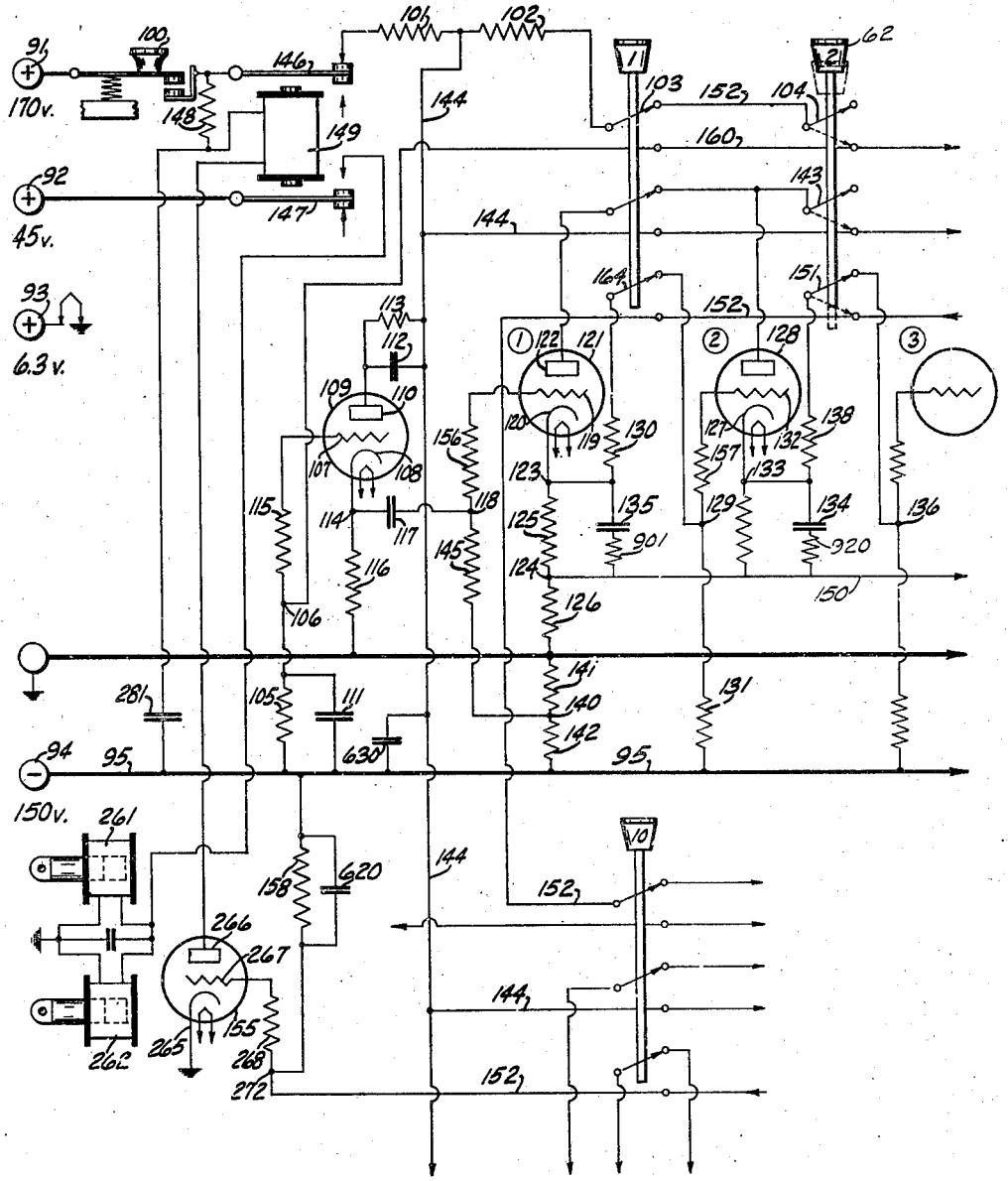
Fig. 7 is a wiring diagram of an enlarged section of a portion of the units denomination of the differential actuator shown in Fig. 6.

Terminal 93, which has a potential of 6.3 volts positive at this time, supplies the current to heat the cathode 265 of control tube 155 and is shown grounded in Figs. 6 and 7 through a typical heater filament symbolical of the heater filaments of all the tubes. The heater circuits from the terminal 93 to the tubes have been omitted because they would tend to obscure other circuits in these figures.

When the main switch 90 is closed and terminal 94 has a 150-volt negative potential applied thereto, the conductor 95 assumes this potential. Grid 267 of the control tube 155, when no digit keys have been depressed, assumes a normal bias of 150 volts negative by being connected to the 150-volt negative conductor through resistor 268 of 250,000 ohms and the paralleled resistor and capacitor comprising resistor 158 of 100,000 ohms and capacitor 620 of .005 microfarad.

The cathode 265 of the control tube 155 is connected to ground. With the grid 267 at a potential of 150 volts negative and the cathode 265 grounded, the tube 155 will not fire.

When the main switch 90 is closed, the 170-volt potential of terminal 91 will not be applied directly to the plate 266 of the control tube 155. However, when the starting switch 100 is closed, the plate 266 has 170 volts applied thereto through a circuit which extends from the terminal 91, over closed contacts of the starting switch 100, through resistor 148 of 300 ohms and the solenoid 149. To slow down the application of this potential to the plate and prevent the possible firing of the tube by the sudden application of this potential when the starting switch is closed, a grounded capacitor 281 of .1 microfarad is connected to the plate circuit at a point between the resistor 148 and the solenoid 149.

When no digit key has been depressed, the closing of switch 100 after switch 90 has been closed, in addition to supplying the plate potential to tube 155, also supplies a positive potential to its grid 267 through switch 146, resistor 101 of 200 ohms, and resistor 102 of 100,000 ohms, through the closed contacts as 103, 104, through the firing impulse conductor 152, and resistor 268. This 170-volt positive impulse on the grid 267 changes the potential of the grid from negative to positive and causes the tube 155 to fire and become conductive, the current flowing through the tube and plate circuit energizing solenoid 149, which operates and closes the circuit to key release solenoids 261 and 262, as explained above, without any result as far as the digit keys are concerned, as none were depressed.

However, if keys have been depressed—for example, the "5" key in the units bank and the "70" key in the tens bank—the 170-volt impulse introduced on conductor 152, by closing starting switch 100 after the main switch 90 has been closed, does not directly affect the grid 267, but is switched so that the 170 volts positive impulse is impressed on the grid of the starting tube 109 of the units denomination, through resistor 115 of 400,000 ohms, firing that tube, as will be explained, to start the sequential firing of the tubes in the units bank. Tube 109 remains conductive until its plate circuit is interrupted by opening switch 100 or switch 146, and as long as this tube remains conductive, it is impossible to start the sending of a second group of impulses over output conductor 150. After the ensuing sequential firing of the "1," "2," "3," "4," and "5" tubes of the units bank, and the starting tube and the "10," "20," "30," "40," "50," "60," and "70" tubes of the tens bank, a positive cathode potential impulse caused by firing the "70" tube is switched onto the firing impulse conductor 152 by the key-operated switch 161 to fire the control tube 155, which tube causes the energization of the solenoid 149 and thereby the energization of solenoids 261 and 262 to cause the release of the keys. The starting switch 100 must be held closed until solenoid 149 is energized. When the solenoid 149 is energized, switch 146 is operated to disconnect the firing impulse conductor 152 and conductor 144, which supplies plate potential to the tubes of the differential actuator, from the source of potential to which they have been connected by the closing of the starting switch 100. By thus removing the potential from the plates of the tubes any conductive tube will be extinguished and none of the tubes can be rendered conductive, so that any impulses which would be generated by shifting contacts as 104, 143, 151, 161, and 191, when the keys are restored to undepressed position with the starting switch 100 closed, would not cause a misoperation of the tubes.

When the "70" key is depressed, as described above and shown in Fig. 6, switch 161 connects the point 272 and the firing impulse conductor 152 to ground through the resistor 269 of 100,000 ohms, the resistor 270 of 25,000 ohms in parallel with a capacitor 273 of .02 microfarad having in series therewith a resistor 900 of 2,500 ohms, through the tens denomination output conductor 153 and the resistor 271 of 5,000 ohms. This causes the potential of the point 272 and grid 267, which are connected to the 150-volt negative conductor 95 through the resistor 158 of 100,000 ohms and capacitor 620 of .005 microfarad in parallel, to drop from 150 volts negative to approximately 84 volts negative, which drop is not sufficient to cause the tube to fire or be conductive. If the circuit just traced were the only circuit in the tens bank, the point 272 would assume the potential of about 84 volts negative, but circuits associated with the "10," "20," "30," "40," "50," "60," and "80" tubes are also included in the tens bank. These circuits form parallel paths which extend from the 150 volts negative conductor 95 through resistors 638, 673, 648, 653, 660, 661, and 671, through switches similar to 161, through resistors similar to 269, through resistors and capacitors in parallel similar to 270, 273, and 900, to the tens denominational output conductor 153 and thence through resistor 271 to ground. These parallel paths between the 150-volt negative conductor 95 and the output conductor 153 cause the effective resistance of this part of the circuit to become smaller and raise the negative potential of the tens output conductor 153 and also raise the negative potential of the point 272 slightly above the 84 volts negative mentioned above. This raise in potential of point 272 will not affect the operation of the tube 155. When the tube "70" fires, its cathode will acquire a positive potential which will cause the potential of the firing impulse conductor 152 and point 272 to change so that the potential of the grid 267 will become about 2½ volts positive and will cause the tube 155 to fire and become conductive. The manner in which the potential of the cathode of tube "70" is raised to a positive value to change the potential of the grid 267 from negative to positive will be made clear during the description of the operation of the differential actuator. The firing of tube 155 will result also if a key in the units denomination bank is depressed and no key in the tens denomination bank is depressed, as the impulse from the last tube to fire in the units bank will have its cathode positive potential impulse shunted around the tens bank on conductor 152 to the grid 267 of the key release control tube 155 instead of to the starting tube 154 of the tens bank, by reason of all the key switches in the tens bank being in normal position.

*Differential actuator*

In describing the differential actuator, as regards its electrical operation, it is necessary to trace the flow of electric energy through the circuits. As the operation of the differential actuator is dependent on relative values of the electric potentials, resistors, capacitors, and the electron tube constants, for the timing and the sequence necessary in producing the differential action, actual values will be given as an example. These values are given to show how the differential operates and should not be considered the only set of values which can be used. The values used are determined by the input voltages selected, by the type of electron tube selected, and by the speed of operation needed. It should be evident from the explanation which follows that certain of the time factors involved result from the proper choice of these values. With the values given here as an example, the impulses for the number "99" may be impressed on the output conductors 150 and 153 to the accumulator, as has been said, in about .0022 second after the starting switch 100 (Figs. 1 and 6) is closed, and the number "1" may be impressed on the output conductor 150 to the accumulator in about .0003 second. If there were five denominational key banks, the number "99999" could be impressed upon the five output conductors to the accumulator in about .0058 second. Inasmuch as it is necessary for the accumulator to respond to the impulses from a given denomination of the differential actuator one by one, it is apparent that its speed of response is at least fractionally faster than the actuator. The extremely high-speed production of differential impulses and operation of an accumulator by the impulses are due to the fact that they are accomplished solely by the flow of electric current without movement of ponderable mass.

The wiring of the circuits of a two-denomination differential actuator is shown in Fig. 6. An enlarged section of part of the circuit is shown in Fig. 7, to which reference is principally made in the following explanation.

In giving the explanation of operation of the sequential firing of the tubes in the differential actuator, the first portion of the units bank (Fig. 7) is used as an example. This portion shows starting switch 100, the "1" and "2" digit keys 62, the tubes 121 and 128 representing digits "1" and "2" respectively, the units denominational order starting tube 109 for starting differential operation of the digit tubes when a key is depressed in this order, the key release control circuits, the circuit breaker switch for "single operation" control, and the various circuits coordinating these elements.

The conditions resulting from the firing of the starting tube 109 are such that they have no effect on the digit-representing tubes except to fire tube 121 representing the digit "1." The method of firing the "1" tube by a starting tube to commence the differential action is used as a convenient way of impressing a uniform firing impulse on the grid of the "1" digit-representing tube 121, in operations wherein a key of that denomination is depressed. It is to be noted that the starting tube could be replaced by any other means that would fire the "1" digit-representing tube. The sequential firing of the tubes is so rapid that the firing of the "1" digit-representing tube cannot be done reliably by the switch 100 alone, because of the possibility that the operator might vibrate switch 100 in closing it, thus giving more than one firing impulse to the digit-representing tube 121 before the keys are released and causing the firing of the selected tubes more than once, which would result in an error in the entry of data. The starting tube is not extinguished and therefore cannot be fired again until the data-entering operation is completed and all the tubes are deprived of energy by the opening of switch 146. It will be explained later how the digit tubes are extinguished after firing, either by the action of the next tube firing or by the completion of the data-entering operation causing switch 146 to open.

Each of the digit-representing tubes 121 and 128 has associated therewith the circuit which connects the 150-volt negative conductor 95 to the ground. The circuit for the "1" digit-representing tube is representative and is traced as follows from ground: through resistor 126 of 5,000 ohms to point 124 and output conductor 150, through resistor 125 of 25,000 ohms and capacitor 135 of .02 microfarad and resistor 901 of 2,500 ohms in series with the capacitor, in parallel to point 123, through resistor 130 of 100,000 ohms, through switch 164 of the unoperated digit key to point 129 and through resistor 131 of 100,000 ohms, to the 150-volt negative conductor 95. The cathode for the "1" digit-representing tube 121 is connected in this circuit at point 123, and the grid for the "2" digit-representing tube 128 is connected, through resistor 157 of 500,000 ohms, to the point 129. The connection of the cathode of the tube of lower digit value to the grid of the tube of next higher digit value by means of circuits such as this one enables the firing of one tube to cause the next tube to fire in sequence.

Although but two digit-representing tubes are to be considered, the explanation given will serve for the whole denominational bank of nine tubes, as the resistors, capacitors, and bias potentials used are of the same values. The firing of the tubes occurs in so short a period of time, ranging in the ten-thousandths of a second, that the transient changes in voltage cannot be measured with absolute certainty, and therefore, although the use of the resistors, capacitors, and the potentials of the electric supply lines of the values as given will result in accurate operation of the machine, the potential fluctuations in the circuits as stated should be deemed approximations and are given chiefly to explain the theory of operation.

In the explanation of the operation of the differential actuator as made in connection with Fig. 7, it will be assumed that the "2" digit key 62 has been depressed manually from a position shown by the full lines to the position shown by the dotted lines and the switches 104, 143, and 151 have been moved from the full-line position to the dotted-line position.

As mentioned previously, when the main switch 90 (Figs. 1 and 8) is closed, terminals 91, 92, 93, and 94 are impressed with the following electric potentials, respectively: 170 volts positive, 45 volts positive, 6.3 volts positive, and 150 volts negative. These terminals, also shown in Figs. 6 and 7, supply the necessary electric energy to operate the differential actuator.

Terminal 93 of 6.3 volts positive, as has been mentioned, supplies the current to heat the cathodes of all the electron tubes in the differential actuator and accumulator and is shown grounded in Figs. 6 and 7 through a typical heater filament symbolical of the filaments of all the tubes. The heater circuits from the terminal to the various tubes have been omitted for the reason that they would tend to obscure the other circuits to be described. Heater elements, which have been symbolically shown in each tube, are connected to terminal 93 and become heated when the main switch 90 is operated.

When the main switch 90 is closed and the potential of 150 volts negative is applied to conductor 95, the grid of the starting tube 109, which is connected to this conductor through resistor 105 of 100,000 ohms and capacitor 111 of .005 microfarad in parallel, point 106, and resistor 115 of 400,000 ohms will assume a negative potential of approximately 150 volts. At the same time, the potential of the cathode 108 of the starting tube 109 and the point 114, which are connected to ground through resistor 116 of 25,000 ohms, will assume a slight negative potential while the capacitor 117 is charging, being connected through capacitor 117, of .00005 microfarad, to point 118, through resistor 145, of 400,000 ohms, to point 140, which is located between resistors 141, of 75,000 ohms, and 142, of 100,000 ohms, connecting the 150-volt negative conductor 95 with ground. When the capacitor 117 has become charged and current no longer flows in this circuit, the point 114 will be at ground potential. The slight negative potential rise of the cathode 108 will not cause the tube 109 to be fired, because the grid 107 at this time has a potential of 150 volts negative and the tube is of the type that will fire and conduct current from the cathode to the anode when the grid has a positive potential or a potential less than 15 volts negative with relation to the grounded cathode.

Upon closing the starting switch 100 after the main switch 90 has been operated, the 170-volt positive terminal 91 is connected to the point 106 in the circuit from the 150-volt negative conductor to the grid 107, which connection is from terminal 91, through starting switch 100, through the normally closed switch 146, resistor 101 of 200 ohms, resistor 102 of 100,000 ohms, switch 103 in its normal unoperated position, conductor 152, switch 104 in its operated position, and conductor 160 to the point 106, to which the grid 107 is connected. This application of 170 volts positive potential to the point 106 will cause the potential of the grid 107 to change from 150 volts negative to about 9 volts positive with respect to the grounded cathode and will cause the starting tube 109 to fire and be conductive. The capacitor 111 of .005 microfarad in the circuit connecting grid 107 with the 150-volt negative conductor 95 acts to slow down the application of the firing voltage to the grid 107.

When the starting switch 100 was closed, as noted above, it also connected the plate 110 of the starting tube 109 to the 170-volt positive terminal through the circuit over the closed switch 100, over the normally closed switch 146, and resistor 101, and from this point over conductor 144, capacitor 112 of .005 microfarad in parallel with resistor 113 of 400,000 ohms, to plate 110.

As the starting tube fires, it allows current to flow from the cathode 108 to the plate 110. The flow of current from cathode 108 to plate 110 is not limited by the 400,000-ohm high resistance 113 until capacitor 112 becomes charged, at which time the resistor 113 becomes effective to reduce the plate-cathode current and also reduce the potential of cathode 108. The potential drop across the tube 109, when conductive, is about 15 volts, as is usual in gaseous electron tubes of this type. This makes point 114 have, after the firing of tube 109 and as capacitor 112 starts to charge, a potential of about 155 volts positive with respect to ground. When resistor 113 assumes the current load as the capacitor 112 becomes charged, the potential of the plate 110 drops to about 25 volts positive with respect to ground, and the cathode 108 and point 114 assume a potential of about 10 volts positive with respect to ground. After the first surge of current from cathode 108 to plate 110 in tube 109, the resistor 113 makes the current flow very small. Resistor 116 limits the cathode current flow before resistance 113 takes effect and acts to make the potential of cathode 108 high while capacitor 112 is charging. Resistor 105, of 100,000 ohms, and resistor 115, of 400,000 ohms, limit the grid current. It is seen, therefore, that, as tube 109 fires, a momentary voltage surge of approximately 146 volts positive is impressed across the .00005-microfarad capacitor 117 to point 118 and causes a positive voltage impulse of about 146 volts to be impressed at said point 118. Point 118 is normally at a potential of 64 volts negative with respect to ground, being connected through resistor 145 of 400,000 ohms to point 140 between resistor 141 of 75,000 ohms and resistor 142 of 100,000 ohms connecting the ground conductor with the 150-volt negative conductor 95.

The grid of the "1" digit-representing tube is connected, through resistor 156 of 100,000 ohms, to the point 118 and assumes its normal potential of 64 volts negative, which changes to a positive potential of about 82 volts when the starting tube fires and impresses the positive potential surge of 146 volts to point 118. When the main switch 90 is closed and the 150 volts negative potential is applied to conductor 95, current will flow in each of the circuits associated with the digit-representing tubes, such as the one traced earlier herein from the 150-volt negative conductor through resistor 131, point 129, switch 164 in normal position, resistor 130, point 123, paralleled resistor 125 and capacitor 135 with resistor 901 in series therewith, output conductor 150, point 124, and, through resistor 126, to ground. The potentials of the points 123 and 129 will become fixed after capacitor 135 becomes charged, and the only current flow will be that determined by the resistors. Under these conditions, the point 123 and cathode 120 of the "1" digit-representing tube connected thereto will assume a potential of about 19 volts negative, point 129 and the grid 132 of the "2" digit-representing tube connected thereto will assume a potential of 84 volts negative, and point 124 and the output conductor 150 connected thereto will assume a potential of 3.2 volts negative.

When the starting switch 100 is operated after the main switch 90 is closed and the "2" digit key is depressed, the 170-volt potential is applied to plate 122 of the "1" digit-representing tube through a circuit traced from terminal 91, operated starting switch 100, switch 146, through resistor 101 of 200 ohms, conductor 144, and through operated switch 143.

With the grid 119 of the "1" digit-representing tube normally at the same potential, 64 volts negative, as is point 118, and the cathode 120 at a potential of 19 volts negative, the gaseous triode "1" digit-representing tube 121 is kept from firing.

When the 146-volt positive potential impulse, caused by the firing of the starting tube 109, is impressed upon the grid 119 of the "1" digit-representing tube 121, it is apparent that grid 119 will become temporarily about 82 volts positive with respect to ground, or 101 volts positive with respect to the 19-volt negative cathode 120, and the tube 121 will fire. The voltage impulse at point 118 which fires tube 121 is kept from grounding by resistor 145 of 400,000 ohms. Resistor 156 of 100,000 ohms in series with resistor 145 limits the grid current of grid 119.

When the tube 121 fires and the gas therein becomes ionized, the internal resistance of the tube drops and the potential difference between plate 122 and cathode 120 drops to about 15 volts, so that cathode 120 and point 123 will have a potential slightly less than 155 volts positive with reference to ground. It should be noted that the resistor 101 of 200 ohms in the plate circuit is much smaller than the resistors 125 and 126 totaling 30,000 ohms in the cathode circuit, and the voltage drop across the resistor 101 will have but little effect in changing the potential of plate 122 when the tube fires.

At the moment the tube fires, the current in the cathode circuit between points 123 and 124 momentarily will be principally through the capacitor 135 and resistor 901, and very little will flow through the resistor 125, so that there will be a very small voltage drop across this resistor. Point 123 will have a potential of 155 volts positive with respect to ground, and point 124 will be slightly less. As the capacitor 135 becomes charged, more current will flow through resistor 125, and the potential drop across the resistor 125 will cause the point 124 to become less positive in potential while point 123 maintains the same potential. The rise of the potential of the cathode 120 toward 155 volts positive will cause the grid 132 of the "2" digit-representing tube 128, which is connected to point 123 through resistor 130, unoperated switch 164, point 129, and resistor 157, to change from its normal negative potential of 84 volts to a positive potential of approximately 2.5 volts. This change in potential of grid 132 will not cause the "2" digit-representing tube to fire immediately, because the point 124 and conductor 150 approach the same potential as point 123 when the capacitor 135 begins to charge, and therefore the cathode 127 of the "2" digit-representing tube, which cathode is connected to output conductor 150 by the resistor 137 and capacitor 134 in series with resistor 920, in parallel, will have a potential change similar to that of grid 132 and will retain the effective biasing potential difference between the grid 132 and cathode 127 of the "2" digit-representing tube, preventing the tube from firing during this period. As the capacitor 135 becomes charged and current begins to flow in resistor 125, there will be a potential drop across this resistor which will increase as the capacitor becomes charged and more current flows through the resistor. Under these conditions, the positive potential of point 124 and the output conductor 150 will decrease as the drop across the resistor 125 increases, while the potential of the point 123 remains unchanged, so that, while the potential of the grid 132 remains at 2.5 volts positive, the potential of the cathode 127 will drop below 17.5 volts positive, at which time the grid 132 will be more positive than 15 volts negative with respect to the cathode 127 and the "2" digit-representing tube 128 will fire and be conductive.

The provision of the 2,500-ohm resistor, like resistor 901 (Fig. 7), in series with each of the capacitors corresponding to capacitor 135 is to repress any tendency toward oscillation in the anode-cathode circuits of the electron discharge tubes. The introduction of such oscillation-preventing resistors into the circuits, as shown, prevents the occurrence of chance oscillations which may be caused by the distributed inductance and capacity of the circuits. Such chance oscillations would tend to extinguish the last tube of the series to fire and, by thus causing an anomalous negative pulse on conductor 150, fire some other tube in the bank.

The oscillation resistors corresponding to resistor 901 have a slight effect in reducing the amplitude of the positive rise in potential of the output conductor 150 as the capacitor 135 is being charged, but do not affect the operation of the sequential firing of the tubes as explained.

Through the same circuit as that described above in connection with the "1" digit-representing tube, the plate of the "2" digit-representing tube has impressed thereon a potential of about 170 volts positive. The cathode circuit for the "2" digit-representing tube is similar to the one for the "1" digit-representing tube, so that, as the "2" digit-representing tube 128 fires, its cathode 127 rises to a positive potential of about 155 volts and the potential of output conductor 150 also rises toward 155 volts. Just as in the case of the "1" digit-representing tube, this potential drops off after capacitor 134 becomes charged and current flows through resistor 137.

Since the "1" digit-representing tube is conducting when the "2" digit-representing tube fires, its cathode 120 is at 155 volts and the surge of positive potential impressed upon output conductor 150, when the "2" tube fires, feeds back through resistor 901 and capacitor 135 and causes the cathode 120 of the "1" digit-representing tube to have a temporary potential rise above the 170-volt positive potential of the plate 122 and causes the current to stop flowing in the cathode-plate circuit, extinguishing the tube and allowing the grid 119 to resume control. Point 136, normally at a potential of 84 volts negative were switch 151 in normal position, would be affected by the firing of tube 128 in the same manner as point 129 was affected by the firing of tube 121 and would cause the potential of the grid for the "3" digit-representing tube to be raised to 2½ volts positive, firing the "3" digit-representing tube as the "2" digit-representing tube was fired, but instead, by operation of the "2" key 62, the grid of the "3" digit-representing tube is connected only to the 150-volt negative conductor 95, giving it a controlling bias potential even though its cathode rises in potential as the conductor 150 rises in potential when the "2" digit-representing tube 128 fires.

It should be noted that the cathode of the digit-representing tube corresponding to the depressed digit key is not connected to the 150-volt negative conductor 95 by the usual circuit to which is connected the grid of the digit-representing tube of next higher value, but is connected by a switch as 151, shifted by depression of the key, to impulse firing conductor 152. This conductor 152 extends to the tens denomination bank of the differential actuator and, if a key is depressed in the tens bank as shown in Fig. 6, said conductor is connected by operated switch 191 to a circuit which extends through resistor 159 of 100,000 ohms and capacitor 165 of .005 microfarad, in parallel to the 150-volt negative conductor, and if no key is depressed in this bank, extends to point 272 where it is connected through resistor 158, of 100,000 ohms, and capacitor 620, of .005 microfarad, in parallel to the 150-volt negative conductor 95.

Therefore, switch 151 having been operated to make contact with the firing impulse conductor 152, the positive potential surge of point 133 is transferred to the firing impulse conductor 152 to be conveyed to the next denomination, there to be switched by an operated switch as 191 to the point 166 to impress the positive pulse on the grid of the starting tube 154 to fire the starting tube 154 of the tens denominational bank (Fig. 6) if a digit key in that denomination is depressed, or to be shunted to point 272 to impress the positive pulse on the grid 267 to fire the key release control tube 155 if no key is depressed. As many tubes will fire in sequence in a denominational bank as are represented by the number of the key depressed in that bank, the starting tube excepted. As each digit-representing tube is fired, a positive voltage impulse of about 146 volts occurs in the denominational output conductor corresponding to conductor 150 or conductor 153, which impulses actuate the accumulator in a manner to be described.

When any digit-representing tube in a denomination is conductive and the capacitor in its cathode circuit is charged, the output conductor for that denomination will have a positive potential of about 26 volts and the cathodes of other tubes in that denomination will be changed from a normal negative potential of 19 volts to a positive potential of about 6.5 volts. The shift of the potential of the cathodes of the digit tubes from 19 volts negative to about 6.5 volts positive will not cause the tubes to fire, because the grids are at about 72 volts negative potential at this time. The values selected for the cathode resistors and capacitors depend on the potentials of the supply conductors and the speed of operation desired.

The grid resistors, the cathode resistors, the oscillation-suppressing resistors, and the timing capacitors are of the same values for all the digit-representing tubes in each denomination. The firing of the digit-representing tubes "1" and "2" in sequence, followed by the extinguishing of the "1" digit-representing tube and the operation of the key release solenoids and single operation switch 146, as described in connection with Fig. 7, is typical of the operation of the differential actuator. It is to be noted that there is no means to extinguish the "2" digit-representing tube 128 until switch 146 opens; therefore, at the end of a data-entering operation, the last tube to fire in the bank will not be extinguished until the switch 146 opens.

In the above description of the operation of the differential actuator, only two digit tubes were considered. When the full bank of nine digit tubes is considered, certain of the potentials will vary, due to the increase in the number of parallel circuits between the output conductor and the 150-volt negative conductor 95, one circuit being provided for each tube except the "9" digit-representing tube. The circuit for the "1" digit-representing tube is representative and has been traced as follows: from the 150-volt negative conductor 95, through resistor 131, point 129, switch 164, resistor 130, point 123, resistor 125 and through resistor 901 and capacitor 135 connected in parallel to resistor 125, to output conductor 150 and point 124, which are connected to ground through resistor 126. As the number of parallel circuits increases, the effective resistance of the circuit between the 150-volt negative conductor 95 and output conductor 150 decreases and the potential drop across this part of the circuit decreases, causing an increase in the negative potential of output conductor 150, the points corresponding to point 123 and cathodes connected thereto and points corresponding to point 129 and grids connected thereto. Since the cathodes and grids have corresponding rises in potential, the variation will not cause the tubes to fire. When the nine digit-representing tubes are considered, the normal potential of the output conductor 150 is 22.6 volts negative instead of 3.2 volts negative, the normal potential of the cathodes is 36.7 volts negative instead of 19 volts negative, and the normal potential of the grids is 93.3 volts negative instead of 84.5 volts negative.

It should also be noted that, when the full bank of nine digit-representing tubes is considered, the potential surges impressed on the output conductor will cause the potentials of the cathodes and grids of the other tubes in the bank to vary with the potential of the output conductor. However, the only grid which receives a sustained rise in potential will be the one connected to the cathode of the tube which has just fired, and the sustained rise of this grid will cause such next tube to fire when the cathode potential of such next tube recedes to a point where the grid is less than 15 volts negative with respect to the cathode.

A potential change delaying arrangement is provided for each of the starting tubes for slowing the application of the positive potential to their grids, which delays the firing of the starting tube in each denominational bank to allow time for the transfer of carry-over data to be made from the next lower denomination of the accumulator before the key set data is entered from the differential actuator, thus avoiding possible interference of the entries. This arrangement, for example, is seen in the circuit between the grid 107 of the starting tube 109 and the 150-volt negative conductor 95 and comprises resistor 105 and capacitor 111.

The key switches corresponding to switch 143 (Fig. 7) connect to the anode plate supply conductor 144, all those tubes of the bank which are of a digit value equal to or lower than the key depressed, and are to be fired in the sequence. By the plate potential supply switches, like switch 143, it is therefore possible to cut out the plate supply of all the tubes representing digits higher in the order than the digit represented by the digit key depressed, and to impress upon the output conductors 150 and 153 of the units and tens denominations of the differential actuator, the exact number of impulses represented by the digit value of the key depressed in their respective banks.

As many such banks of differential actuators may be connected together as desired, said banks operating in sequence. The switching circuits controlled by the keys are so arranged that if there be no key depressed in a denomination the impulse for firing the starting tube will be shunted on firing impulse conductor 152 to the next denomination in which there is a key depressed. At the end of tis circuit through the denominational banks, the firing impulse conductor 152 is connected, as has been explained, to the grid of the key release control tube 155 (Figs. 6 and 7), operating the solenoid 149 which opens switch 146 to break the plate supply and closes the normally open contact 147, which contact 147, when closed, causes the energization of solenoids 261 and 262 and the consequent release of the keys.

In the circuit shown in Fig. 6, the sequence of firing is the units denomination first and the tens denomination second. If the keys in the first bank were renumbered as tens keys (Fig. 11) and the keys in the second bank were renumbered as units keys, and if conductor 153 were connected to the units bank input terminal of the accumulator and the conductor 150 were connected to the tens bank input terminal of the accumulator, it would be possible to enter the differential data into the accumulator in the tens bank first and the units bank second. Under those circumstances, the transfer of carry-overs from tens denominational bank to hundreds denominational bank would not interfere with data-entering operations even though no timing delay between sequential operation of denominational banks were provided. This optional method of denominating the banks and of connecting the output conductors from the differential actuator is deemed to be within the scope of this invention.

A capacitor 630 of .5 microfarad is placed between the plate supply conductor 144 and the 150-volt negative conductor to prevent a too sudden application of plate potential to the differential actuator digit tubes.

*Power supply controls*

Means have been provided for controlling the application and removal of potentials to and from certain circuits of the machine and also for indicating when the tubes of the actuator and accumulator are in condition to operate and for controlling the application and removal of potentials to and from various circuits automatically at that time.

When the main switch 90 (Fig. 8) is open, the sources of potential are removed from all circuits, extinguishing all tubes in the actuator and accumulator to clear these parts of data and in general preventing the operation of the machine.

The closing of the main switch 90, as mentioned earlier herein, impresses terminals 91, 92, 93, and 94 of the differential actuator with their respective potentials to enable the actuator to operate.

The closing of the main switch 90 also completes certain circuits to apply potentials to certain terminals associated with the accumulator and enables other means to apply potentials to other terminals associated with the accumulator when the tubes are in condition to operate. The main switch 90 directly closes circuits to impress the terminals 94, 96, and 97 associated with the accumulator with potentials of 150 volts negative, 100 volts positive, and 175 volts negative respectively. The terminal 93, which has 6.3 volts impressed thereon upon operation of the switch, is also associated with the accumulator to provide a source of potential for the heater elements of the tubes in the accumulator. Another of the circuits closed by the operation of the main switch 90 can be traced, starting at the 170-volt positive supply terminal (Fig. 8), through conductor 402, switch 417, contact 403, and conductor 404 to terminal 580, and enables data standing on a result indicator to be set up in the accumulator elements to condition the accumulator to be responsive to actuation by the differential actuator, all of which will be explained more fully later. A further one of the circuits closed by the operation of the main switch 90 extends from the 170-volt positive potential source, through conductor 405, switch 427, contact 407, conductor 408, and resistor 409 of 5,000 ohms to ground and operates to keep the potential in the conductors connected to the 170-volt positive source cushioned against sharp fluctuation as loads are cut in and out during the operations preparatory to operating the machine.

An electron gas discharge tube 411 is provided in the control means to cause the operation of switches to apply a potential of 135 volts negative to terminal 89 and a potential of 170 volts positive to terminals 98 or 99, depending upon the position of the restore and reset key switch 401, and remove the potential of 170 volts positive from terminal 580. The cathode 412 of tube 411 is connected to ground through the winding of the magnet 415 and the resistor 416 of 2,000 ohms. The grid 435 of tube 411 is connected to ground through resistor 414 of 100,000 ohms and, having the same potential as the cathode 412, it will not prevent tube 411 from firing and the tube will fire as soon as the cathode 412 is heated by its heater 436. The grid 435, being at ground potential and being located between the plate 410 and the cathode 412, assists in starting current to flow in the cathode-plate circuit. The main starting switch 90 connects the 2.5-volt positive supply, through conductor 442, to the heater element, which also is connected to ground.

The 170-volt positive potential supply is connected by the main switch 90 to conductor 447, which is connected to the restore and reset key switch 401, from which the circuit may have either of two paths, depending upon whether or not the key switch 401 is depressed. Before the key switch 401 is depressed, the circuit extends through contact 425 over conductor 406 to switch 419, which engages a contact which is not connected to any other conductor. When the key switch 401 is operated, the circuit extends through contact 455 to conductor 433, switch 426, and contact 413 to plate 410 to impress a positive potential of 170 volts on the plate of the tube 411.

It is clear that tube 411 will become conductive upon the operation of the main switch 90 and the operation of the restore and reset key switch 401 and after the heater element 436 has heated the cathode 412 sufficiently to start electron emission. By the time the heater 436 has heated cathode 412, the heater elements of the other tubes associated with the differential actuator and accumulator will have been heated sufficiently so that the actuator and accumulator may be operated.

As tube 411 becomes conductive and current flows in its cathode-plate circuit, the magnet 415 becomes energized and causes the switches 417, 418, and 419 to be shifted from their normal position into engagement with contacts 420, 421, and 422, respectively. The shifting of switch 417 breaks the circuit at 403 to the terminal 580, removing the 170-volt positive potential therefrom to prevent further entries in the accumulator under control of the indicator, and closes a circuit from the 170-volt positive supply over closed main switch 90, conductor 402, switch 417, contact 420, to magnet 415 to maintain this magnet energized until the main switch 90 is opened. The application of the 170-volt positive potential to contact 420 will raise the potential of the cathode 412 to the potential of the plate 410 and will cause the tube 411 to cease being conductive, but magnet 415 is kept energized by the circuit over switch 417 and will not become deenergized when the tube 411 stops conducting. The shifting of switch 418 completes a circuit from the 135-volt positive potential, through operated main switch 90, conductor 448, non-indicate switch 423 in closed position, contact 421, and switch 418 in moved position to terminal 89. This terminal is connected to the operating means for the indicating means and will cause the indicating means to be operated to show the amounts standing in the accumulator in a manner to be explained more fully later. The operation of the non-indicate switch 423, which is provided to control whether or not the indicator means will be operative to indicate amounts standing on the accumulator, will interrupt the circuit from the 135-volt positive source of supply to terminal 89 to prevent the application of potential thereto and operation of the indicating means even though switch 418 be operated. The engagement of switch 419 with contact 422 prepares several circuits which are completed when the restore and reset key switch 401 is in its normal position. These circuits are the same from the 170-volt positive supply source, through operated main switch 90, conductor 447, switch 401, contact 425, conductor 406, and shifted switch 419 to contact 422, where the circuits branch, one going through conductor 439 to impress 170 volts positive on the terminal 98 associated with the transfer tube anodes or plates associated with the accumulator, and the other going to point 444, through the winding of a magnet 424, resistor 443 of 2,000 ohms, and conductor 449 to ground to energize magnet 424.

When magnet 424 becomes energized, it shifts switches 426, 427, and 428 into engagement with contacts 429, 430, and 431 respectively. The shifting of switch 426 breaks, at 413, the circuit to plate 410 of the tube 411 and connects the circuit from the 170 volts positive potential source, through operated main switch 90, conductor 447, restore and reset key switch 401 when operated, contact 455, conductor 433, switch 426, contact 429, and conductor 434 to terminal 99 associated with the accumulator, so that 170 volts positive may be applied to terminall 99 upon a subsequent operation of the restore and reset key switch 401 to cause the accumulator and indicator to be reset to zero by means to be described hereinafter more fully. The shifting of switch 427 breaks, at 407, the circuit from the 170-volt positive supply to ground through resistor 409 and closes a circuit from the 170-volt positive potential supply through operated main switch 90, conductor 405, switch 427, contact 430, point 444, magnet 424, resistor 443 of 2,000 ohms, and conductor 449 to ground to provide a holding circuit for magnet 424, which maintains the magnet 424 energized as long as the main switch 90 is closed. The switch 428, when operated, completes a circuit from the 2.5-volt positive potential supply to ground, through operated main switch 90, conductor 442, switch 428, contact 431, and signal light 510, causing the light to be lighted to indicate when the cathodes have been heated and the restore and reset key switch 401 has been returned to normal position after starting the conduction in tube 411, and also that the machine is ready for operation. As long as the signal light 510 is illuminated, it indicates that the elements of the machine are in condition to be operated.

It is seen from the above that, in order to prepare the machine for operation, the main switch 90 must be closed to cause the heating elements for the tubes to heat the tubes and also to close circuits to apply potential to the actuator and accumulator and to the indicator to set up in the accumulator the amount left on the accumulator at the end of the last previous operation. Next, the restore and reset key switch 401 must be depressed, and, if the cathodes of the tubes have been properly heated, switches will be operated to break the circuit to the indicator to prevent repeated setting of the amount contained in the indicator into the accumulator, and potentials will be applied to other terminals associated with the accumulator. The last step in preparing the machine for operation occurs when key switch 401 is released, and this will cause further switches to operate to apply potential to the remaining terminals associated with the accumulator, and a signal light will be lighted to indicate that the tubes are properly heated and that potentials have been impressed on all the terminals necessary for a proper operation of the machine. These conditions will continue until the main switch 90 is opened.

*Accumulator*

The impulses produced by a given denominational order of the differential actuator are entered into the corresponding denominational order of the accumulator through an input terminal which is connected to a related output conductor of the actuator.

Each denominational order of the accumulator is similar to all the others except in certain specific instances that will be pointed out, so that an explanation of the units denominational order of the accumulator will serve as an explanation of any order. Ten tubes 331 to 340 inclusive designated "0," "1," "2," "3," "4," "5," "6," "7," "8," and "9" (Figs. 9A, 9B, and 9C) are used as digit-representing tubes. These tubes are of the gaseous triode type similar to those used in the differential actuator, in which type of tube the grid is normally biased to prevent the tube from being conductive. When the grid in such a tube loses control because of an increased positive potential with relation to the cathode and the tube fires, the grid does not regain control until the cathode-plate current is stopped by some other means. The circuits operatively connecting these tubes in an endless chain series have been arranged so that the impulses sent to the accumulator cause the tubes to fire one at a time in sequence from one digit value to the next higher until the tube representing "9" operates, and then to begin the series over at the "0" digit-representing tube, each impulse firing a tube and that tube remaining conductive until the next impulse is received. The firing of a tube quenches or extinguishes the tube of next lower digit value and prepares the tube of next higher digit value to render it conductive by the next impulse. The tube, which is conductive, represents the units digit of the accumulated data of that denomination, and means are provided to sense the conductive or non-conductive condition of the tubes in a denomination and to indicate which one is conductive.

When the tube 340 representing the digit "9" has been fired and is conducting, it prepares the "0" digit-representing tube 331 and a transfer tube 341 so that the next impulse will fire both of these tubes and will extinguish the "9" digit-representing tube. The transfer tube 341 is of the gaseous triode type similar to those used in the differential actuator and digit-representing tubes of the accumulator, but is so connected in the circuit as to be self-extinguishing. When the tube 341 is fired, it sends an impulse to the tens denomination to cause the prepared digit-representing tube in that order to be fired to cause the entry of "one" in that order.

In order to insure that the impulses from the differential actuator to the accumulator will be of sufficient magnitude and of constant amplitude so as to cause the proper operation of the accumulator, an electron discharge relay tube is inserted between each of the impulse output conductors from the differential actuator and the digit-representing tubes of a related denominational order of the accumulator. The gaseous triode type of electron tube and the particular circuit used to amplify and stabilize the impulses from the differential actuator have been employed because they are capable of amplifying the high-speed impulses used and will keep the amplified impulses entered into the accumulator of the same polarity as they are when received from the differential actuator.

When the main switch 99 is opened, removing the various potentials from the terminals associated with the accumulator, the tubes cease to be conductive and will no longer represent data. In order to condition the digit-representing tubes of the accumulator for operation by the impulses from the differential actuator, circuits are completed through the indicating means, when the main switch 90 is closed, to cause the said digit-representing tubes of the accumulator corresponding to the setting of the indicating means to fire and to prepare the digit-representing tubes of next higher digit value for operation when the next impulse is received from the actuator.

An outstanding difference between the sequential operation of the digit-representing tubes in the differential actuator and the digit-representing tubes of the accumulator resides in the control of the firing of the tubes. In the differential actuator, the digit-representing tubes are fired in sequence by their own interaction, whereas in the accumulator the digit-representing tubes are merely prepared for sequential firing by their interaction and are actually fired by impulses from the differential actuator.

The operation and function of the various tubes used in the accumulator having been explained, the circuits will now be described for the units denominational order which are representative of those used in the various orders of the accumulator.

The input terminal of the units denominational order of the accumulator is designated (in Figs. 6 and 9A) as 300 and is connected to the output conductor 150 of the differential actuator through capacitor 315 (see Fig. 6) of .00005 microfarad. Terminal 300 leads to the grid 301 (Fig. 9A) of the gaseous triode tube 302 through resistor 902 of 50,000 ohms.

As the main switch 90 is closed and the machine made ready for operation, 170 volts positive is applied to the plate anode 303 of amplifying tube 302 (Figs. 8 and 9A) through terminal 93. The grid 301 is also connected from point 911 through resistor 908 of 100,000 ohms to point 903 between resistor 904 of 100,000 ohms connected to terminal 94 of 150 volts negative, and resistor 905 of 50,000 ohms connected to ground. This gives grid 301 a normal bias potential of about 50 volts negative in relation to ground. The cathode 306 is connected to point 906, which lies between resistor 907 of 125,000 ohms connected to the negative 150-volt terminal 94 and resistor 909 of 25,000 ohms in parallel with capacitor 910 of .00025 microfarad connected to ground. The cathode 306, therefore, assumes a negative potential of 25 volts in relation to ground. Under these conditions tube 302 will not fire, as the grid 301 must be more positive than 15 volts negative with respect to the cathode before such a tube will fire. The differential impulses issuing from the differential actuator from point 300 (Figs. 6 and 9A), because of the small size of capacitor 315 (Fig. 6), are weakened in amplitude to about 50 volts, but are sufficient to fire the tube 302 (Fig. 9A) by destroying the control of the grid. These impulses vary slightly in amplitude, depending on the digit key used, as has been explained. As the tube 302 fires, the cathode immediately rises to 155 volts positive, which causes a net change of potential at point 906 of 180 volts in a positive sense, which positive impulse is conveyed over conductor 321, which is connected through capacitors 371, 372, 373, 374, 375, 376, 377, 378, 379, 380, and 382 to the digit-representing tubes 331, 332, 333, 334, 335, 336, 337, 338, 339, and 340, respectively, of the units order and the transfer tube 341 (Figs. 9A, 9B, and 9C).

The capacitor 910, in conjunction with resistor 909, the distributed and the distributed capacity and inductance in the conductors and capacitors coupling point 906 to the grids of the counter tubes 331 to 340, inclusive, and to ground, inductance in the wiring of the cathode circuit of tube 302, tends to set up an electrical oscillation in the cathode 306 upon the tube 302 firing, which causes the discharge in the tube 302 to be extinguished because of the cathode potential rising above the potential of plate 303. This extinguishing of tube 302 occurs in less than one twenty-thousandth of a second after the firing. The grid 301 resumes its negative bias and the tube 302 is ready to be fired on the receipt of the next differential impulse at point 300. Thus the differential impulses are relayed to signal line 321 in a manner to increase their strength and to render them uniform in amplitude and duration. This relay, which is self-timed to operate and reset itself between impulses from the differential actuator, forms one of the novel features of this disclosure.

It is to be noted that the distributed inductance and capacity in conductor 321, and capacitors 371 to 380 inclusive and their connections to ground operate together with capacitor 910 and resistor 909 to determine the period of recovery of the tube 302 to a non-discharge condition. There being no appreciable inductive load in the anode-cathode circuit, and the circuit elements being such as to cause the oscillatory rise in potential of point 906 to follow in less than one twenty-thousandth of a second after a discharge occurs, the tube 302 is allowed to have a very fast recovery to the non-discharging condition.

The tens denominational bank of the accumulator (Figs. 10A, 10B, and 10C) is provided with a similar relay tube 353 (Fig. 10A) to receive differential impulses from point 351 (Figs. 6 and 10A) through a 50,000-ohm resistor 912 to grid 352 (Fig. 10A) which is biased through resistor 913 of 100,000 ohms by the potential of point 914, which is 50 volts negative with respect to ground, as it is connected to ground through resistor 915 of 50,000 ohms, and to the 150-volt negative terminal 94 through resistor 916 of 100,000 ohms. The cathode 324 has a normal potential of 27.5 volts negative. This relay tube cathode 324 for the tens bank obtains its potential from point 326, which is connected to the 150-volt negative terminal 94 through resistor 917 of 250,000 ohms, to the ground through resistor 918 of 50,000 ohms in parallel with capacitor 919 of .00025 microfarad, to the 175-volt negative terminal 97 (Fig. 9A) by means of signal line 821 (Figs. 10A, 10B, and 10C), point 343 (Figs. 10C and 9C), point 920 (Fig. 9C), through resistor 491 of 250,000 ohms to conductor 309 (Figs. 9A, 9B, and 9C), and connected to the ground through point 490 (Fig. 9C) and resistor 460 of 50,000 ohms. Any accumulator bank added to the system of accumulators above the tens denominational order has the relay tube cathode potential derived in a similar manner. The operation of tube 353 to fire on receipt of impulses from its associated differential actuator, sending a positive potential impulse to all the digit-representing tubes of the tens denominational bank is the same as has been previously explained in connection wtih the units denominational bank.

The potential surges approaching 180 volts as a maximum in the positive sense which are applied to the impulse conductors such as 321 (Fig. 9A) will cause certain of the digit-representing tubes of the accumulator to be fired and become conductive.

As stated before, when the main switch 90 is closed, it applies a positive potential of 100 volts to terminal 96 (Figs. 8 and 9A) associated with the accumulator. This terminal 96 is connected to the plates of the digit-representing tubes 331 to 340 through the following circuit: from terminal 96, through conductor 323, conductor 347, normally closed switch 346, resistor 345 of 300 ohms, and common conductor 344, to which the plate of each tube is connected. Common conductor 344 is connected to ground through a capacitor 356 of .1 microfarad to prevent the application of this potential too suddenly on the plates of the digit-representing tube.

In a manner similar to that explained in connection with the digit-representing tubes of the differential actuator, each digit-representing tube of the accumulator has associated therewith a circuit which connects the 175-volt negative potential conductor 309 with ground, to which circuit are connected, at proper points, the cathode of the associated digit-representing tube and the grid of the digit-representing tube of the next higher digit value. The circuit associated with the "4" digit-representing tube of the units order of the accumulator (Fig, 9B) is representative of these circuits and extends from the 175-volt negative potential conductor 309 through resistor 390 of 50,000 ohms, resistor 391 of 60,000 ohms, point 438, and resistor 354 of 25,000 ohms to ground. When the main switch 90 is closed and potential is applied to conductor 309, the cathode of the "4" digit-representing tube, which is connected to point 438, will assume a negative potential of about 32 volts and the grid of the "5" digit-representing tube, which is connected through resistor 366 of 100,000 ohms and resistor 688 of 400,000 ohms to point 389 between resistors 390 and 391, will assume a negative potential of about 110 volts. As the above circuit is typical, it is clear that, under the circumstances indicated, the cathodes of the digit-representing tubes will assume a negative potential of about 32 volts and the grids of these tubes will assume a negative potential of about 110 volts. Connecting the cathode of a digit-representing tube with the grid of the tube representing the next higher digit value by means of the typical circuit enables the firing of one tube to prepare the next tube for firing when the next impulse is received from the differential actuator, or, in the higher denominational orders, from the differential actuator or a transfer tube.

After the main switch 90 has been operated, the switch 419 (Fig. 8) has been shifted, and the restore and reset key switch 401 has been returned to its normal position, as explained previously, a positive potential of 170 volts is applied to terminal 98. Terminal 98 is connected through conductor 348 and resistor 349 of 500 ohms to the plate of the transfer tube 341. Conductor 348 is connected to ground through capacitor 360 of .1 microfarad to avoid application of potential to the plate of the transfer tube too suddenly. The cathode 489 of the transfer tube 341 is connected to point 490 in a circuit which extends from the 175-volt negative potential conductor 309, through resistor 491 of 250,000 ohms, point 490, and resistor 460 of 50,000 ohms to ground and assumes a negative potential of about 28 volts.

The grid of each of the digit-representing tubes 331 to 340 is also connected, through an individual capacitor, to impulse conductor 321 in order that the impulses impressed on the conductor 321 may cause the prepared tube to fire. The connection for the grid of the "5" digit-representing tube is representative and extends from impulse conductor 321, through a capacitor 376 of .00001 microfarad, to a point between the resistor 366 of 100,000 ohms and resistor 688 of 400,000 ohms. These capacitors for the units order are numbered 371 to 380 inclusive, and these 400,000-ohm resistors are numbered 681, 683, 685, 687, 688, 689, 691, 693, and 695. The values for the capacitors as 376 and resistors as 688 may be varied to adjust the time of operation of the accumulator so that the accumulator will respond to the impulses entering on conductor 321 and will not lag and fail to respond to any one of such impulses. The resistors and capacitors shown provide for the proper timing of the operation of the accumulator when considered with the values given to the resistors and capacitors of the differential actuator.

The grid 492 of the transfer tube 341 also has a connection to the impulse conductor 321, extending from point 488 located between resistors 381 of 100,000 ohms and 441 of 250,000 ohms, and through a capacitor 382 of .00001 microfarad.

The restoration of amounts to the accumulator under control of the indicator will now be described.

It has been explained how, upon the main switch 90 being closed, 170 volts positive potential is impressed through conductor 402 and contact 403 (Fig. 8) to the restoring impulse terminal 580 (see also Fig. 9A). Terminal 580 is connected by conductor 581 (Figs. 9A, 9B, and 9C), which, passing through resistor 383 (Fig. 9C) of 30,000 ohms, is connected to wiper arm 384 coacting with the "5" contact 386 in the data-restoring means commutator 385 associated with the indicating means which serves the units denominational order. The wiper arm 384 which stands, for purposes of illustration, on the contact representing the "5" digit-representing tube 336 is shown in the position in which it stopped when main switch 90 (Fig. 8) was last opened, indicating the number then standing in the units denominational order. When the 170 volts positive potential is applied to terminal 580, this potential will be applied through conductor 581, resistor 383, wiper arm 384, contact 386 (Fig. 9C), conductor 387, and resistor 388 (Fig. 9B) of 50,000 ohms to point 389.

As explained above, point 389, before the 170 volts positive potential is applied, is at a potential of about 110 volts negative with respect to ground, being connected to the 175-volt negative conductor 309 by resistor 390 of 50,000 ohms and being connected to ground through resistor 391 of 60,000 ohms in series with resistor 354 of 25,000 ohms. Therefore, the grid 392 of the "5" digit-representing tube, being of the same potential as point 389, is 110 volts negative with respect to ground. At the same time, cathode 393 of the "5" digit-representing tube is 32 volts negative with respect to ground, being connected to ground through resistor 355 of 25,000 ohms and connected to the 175-volt negative conductor 309 through resistor 394 of 60,000 ohms and resistor 395 of 50,000 ohms. Under these conditions, the "4" digit-representing tube is non-conductive because, as before stated, in the particular type of tube used, the "firing" occurs when the grid becomes more positive than 15 volts negative with respect to the cathode. Therefore, when the 170-volt positive potential is applied through wiper arm 384 and contact 386, the potential of point 389 changes to 31½ volts negative, as it is then connected to the 170-volt positive conductor through resistor 388 (Fig. 9B) of 50,000 ohms and resistor 383 (Fig. 9C) of 30,000 ohms, is connected to the 175-volt negative conductor 309 (Fig. 9B) through resistor 390 of 50,000 ohms, and is connected to the ground through resistor 391 of 60,000 ohms and resistor 354 of 25,000 ohms. The potential of grid 392 is then 31½ volts negative as compared with the cathode potential of 32 volts negative, and the "5" digit-representing tube fires. In this manner, as soon as the main switch 90 is closed, the digit "5," which stood in the indicator for the units denominational order in the accumulator when the main switch 90 was opened and the "5" tube was rendered non-conductive, is restored to the accumulator by causing the "5" digit-representing tube to become conductive. When the "5" digit-representing tube becomes conductive, the potential of cathode 393 immediately rises from its normal negative potential of 32 volts to within 15 volts of the plate 396 due to the high resistance in the cathode circuit, and since the plate is approximately 100 volts positive, the cathode 393 will assume a positive potential of about 85 volts, producing a net potential change for the cathode 393 of about 117 volts in the positive sense. The change in the potential of the cathode 393 will cause the potential of point 452 to change from its normal negative potential of 110 volts to 57 volts negative, as this point is connected to point 453, which is connected through resistor 395 of 50,000 ohms to the conductive cathode 393 having a positive potential of 85 volts and is connected through resistor 395 of 50,000 ohms to the 175-volt negative conductor 309. This change in potential of points, such as point 452, when the tubes are conductive, is used to control the operation of the stepping magnet for the indicating means.

The circuits involved in the operation of the stepping magnet 503 and the manner in which the potential change of points, such as point 452, exert their control will now be described.

Two electron tubes are associated with each stepping magnet. The stepping magnet control tube 472 and the stepping magnet energizing tube 454 for the units denominational order stepping magnet 503 (Fig. 9A) are representative, so that a description of their operation will apply also to similar elements in the other denominational order.

Tube 472 is of the vacuum type, having a central grid, and tube 454 is of the gaseous type, having a central grid and a screen.

The plate 477 of the stepping magnet control tube 472 is connected through resistor 504 of 500,000 ohms to ground. The cathode 471 of this tube is connected through conductor 473 to point 474, which point is connected to ground through resistor 475 of 50,000 ohms and is connected to the 175-volt negative potential conductor 309 through resistor 476 of 50,000 ohms, causing the cathode to assume a negative potential of 87 volts when the main switch 90 is closed. The grid 478 of this tube is connected through conductor 479, resistor 712 of 1,000,000 ohms, wiper switch 397, contact 525 of commutator 526 (the indicating means showing "5" in the example being described), and resistor 451 of 50,000 ohms to point 452, which is normally at 110 volts negative potential, but which changes, as explained above, to 57 volts negative when the "5" digit tube is conductive. Tube 472, being a grid-controlled vacuum tube, will conduct current from the cathode to plate when ever the grid is at a potential more positive than 8 volts negative with respect to the cathode. It is seen, therefore, that the control tube 472 will be conductive when wiper arm 397 stands on a contact of the commutator 526, which contact has a potential more positive than 79 volts negative with respect to ground. Due to the negative potential of the cathode 471 and the resistor 504 through which the plate 477 is connected to ground, plate 477 will assume a negative potential as soon as the tube 472 becomes conductive.

The stepping magnet energizing tube 454 is of the gaseous type and will become conductive when its grid is not at a sufficient negative bias and potential is applied to the cathode-plate circuit. Once the tube begins to discharge, it will continue to discharge until the cathode-plate circuit is interrupted, even though the grid assumes a negative biasing potential. If the grid is at a sufficient negative bias when the cathode-plate circuit is completed, the tube will not fire or become conductive.

The plate 502 of the stepping magnet energizing tube 454 is connected through the winding of the stepping magnet 503, normally closed contact 508, wiper arm 505, contacts of commutator 506, and conductor 507 to terminal 89. The 135-volt positive potential is not applied to terminal 89 directly by the operation of main switch 90, but, as described earlier, requires the operation of key switch 401. The cathode 501 of this tube is connected directly to ground. The grid 475 of this tube is connected to the plate 477 of tube 472 and is normally at ground potential, but will assume a negative potential whenever tube 472 is conductive. Inasmuch as the grid 479 is at ground potential when the control tube 472 is not conductive and the cathode 501 is also at ground potential, the stepping magnet energizing tube 454 will fire and become conductive as soon as potential is supplied to plate 502. When tube 454 is conducting, the current through plate 502 will energize the stepping magnet 503 and cause the armature 509 to be attracted thereto. The armature 509 associated with the stepping magnet 503 (Figs. 4 and 5) has attached thereto an arm 575 carrying a pawl 532 cooperating with a ratchet 535 connected to the axle 536, to which are fastened the wiper arms 384, 397, and 505. The pawl and the ratchet are so arranged that when the armature 509 is attracted by the magnet 503, the armature merely tensions a return spring 531 and when the magnet is deenergized, the return spring 531 moves the armature 509 and the pawl 532 to operate the ratchet 535 and move the wiper arms one step. The armature 509, upon being attracted by energization of the stepping magnet 503, will cause the contact 508 to open and interrupt the circuit through the winding of the stepping magnet 503, causing the magnet to become deenergized, causing the pawl and ratchet to move the wiper arms one step, and causing the contact 508 to close to again complete the circuit from the wiper arm 505 through the winding of the magnet 503 to plate 502. As the wiper arm 505 steps from contact to contact on the commutator 506, it will engage the insulation between the contacts and interrupt the circuit from terminal 89 to plate 502. The circuit from terminal 89 to plate 502 will therefore be broken in two places and will not be reclosed to supply potential to the plate 502 until contact 508 is closed and wiper arm 505 engages the next contact on the commutator. If grid 479 has no negative bias, the application of potential to plate 502 will cause the energizing tube 454 to become conductive, and the subsequent current in the cathode-plate circuit will cause the stepping magnet 503 to become energized again. This energization and deenergization of the stepping magnet 503 is repeated as often as the stepping magnet energizing tube 454 is conductive.

The timing of the closing of the control circuit for the grid 479 of the stepping magnet control tube 472 through wiper arm 397 and the closing of the circuit to apply potential to plate 502 of the stepping magnet energizing tube is such that the control tube can operate, if controlled by an operating digit-representing tube, to apply negative potential to grid 497 of the energizing tube 454 before the potential is applied to plate 502, so as to prevent the firing of the stepping magnet energizing tube 454.

As has been pointed out, the stepping magnet control tube 472 is of the vacuum type and will be conductive when its grid is more positive than 8 volts negative with respect to its cathode 471, which has a normal potential of 87 volts negative, and the stepping magnet energizing tube 454 is of the gaseous discharge type and will fire and become conductive if its grid is not at a sufficient negative bias when potential is applied to its cathode-plate circuit, and will remain conductive even though a biasing potential is applied to the grid after the tube becomes conductive. It follows, therefore, that, as long as the wiper arm 397, to which the grid of the control tube 472 is connected, is moved step by step over the contacts of the commutator 526 and engages contacts connected to the cathodes of non-conducting digit-representing tubes, which contacts have a negative potential of 110 volts, the control tube 472 will be non-conductive, the grid 479 will remain at ground potential, and the energizing tube 454 will fire and extinguish repeatedly upon the repeated closing and opening of the circuit to plate 502 by the continued operation of the armature 509 and contacts 508 and the step-by-step movement of the wiper arm 505. When, however, the wiper arm 397 engages a contact of the commutator 526, which contact is connected to the cathode of a conducting digit-representing tube and has therefore changed from a negative potential of 110 volts to a negative potential of 57 volts, the control tube 472 will be rendered conductive, causing the grid 479 to assume a negative bias, and the energizing tube 454 will be prevented from refiring upon the reclosing of its plate circuit, thus preventing the further stepping of the wiper arms 397 and 505.

Up to this point it is assumed that, in preparing the actuator and accumulator for operation, the only manual operation has been to operate the main switch 90 (Fig. 8), which caused the application of various potentials to the terminals 91, 92, 93, and 94 of the differential actuator to prepare for the operation of the digit-representing tubes and other related tubes therein, caused the application of various potentials to terminals 95, 96, and 97 of the accumulator to prepare for the operation of the digit-representing tubes therein, and caused the application of potential to the terminal 580 to cause digit-representing tubes to be fired and rendered conductive to restore into the accumulator the data which was left on the indicator at the end of the last operation before the main switch was opened. This causes the "5" digit-representing tube in the units denominational order of the accumulator to become conductive, changing the potential of the point 452 and contact 525 from 110 volts negative to 57 volts negative, which causes the stepping magnet control tube 472 to become conductive and the potential of the grid 479 of the stepping magnet energizing tube 454 to become negative. At this stage of the preparation, potential has not been applied to terminal 89 and the plate 502 of tube 454 connected thereto, and consequently, even if the potential of grid 479 were not negative, there would be no energization of the stepping magnet 503.

The restore and reset key switch 401 is now depressed, as explained earlier herein, and causes the magnet 415 (Fig. 8) to become energized, which magnet, when energized, shifts switch 417 to break, at contact 403, the connection to terminal 580 to prevent repeated entry of amounts under control of the indicating means, and shifts switch 418 to engage contact 421 so as to apply a 135-volt positive potential to terminal 89 from the 135-volt positive potential source, over circuits traced earlier in connection with Fig. 8. The 135-volt positive potential is applied through conductor 507 to each contact of the contacts on commutator 506, wiper arm 505, closed switch 508, and the winding of stepping magnet 503 to plate 502, but, as the grid 479 is negative at this time, tube 454 is non-conductive and no current flows through the magnet 503.

The magnet 415 will remain energized through its holding circuit over switch 417 as long as the main switch 99 is closed. When the key switch 401 is released and is restored to its normal or upper position, it closes a circuit to energize magnet 424, which will shift switch 429 to prepare a circuit to cause the application of 170 volts to terminal 99 and the winding of resetting control magnet 541 connected thereto, which circuit will be completed by the key switch 401 when operated after magnet 424 has been energized. Magnet 424 also closes the circuit to the signal light 510 to cause the signal light to be lighted to indicate that the accumulator is ready to receive entries from the differential actuator under control of the digit keys.

In the example being given, the condition of the accumulator when the signal light 510 is lighted is as follows.

The "5" digit-representing tube is conductive at this time; the stepping magnet energizing tube 454 has potential applied to its plate circuit, but is non-conductive due to the negative bias of the grid 479; the tube 302 for amplifying the positive potential impulses from the differential actuator is operative; the plates of all the digit-representing tubes are impressed with 100 volts positive; the cathodes of the same tubes are at 32 volts negative potential with the exception of the conductive "5" digit-representing tube, which is at 85 volts positive potential; points 511, 512, 513, 514, 515, 516, 517, and 518 are at 110 volts negative potential; point 389, due to the current from grid 392 to cathode 393, is slightly less than 110 volts negative potential; point 452 is about 57 volts negative potential; and grid 522 of the "6" digit-representing tube 337, which is connected to point 452, will have a potential of 57 volts negative, a potential sufficient to prevent the "6" digit-representing tube 337 from firing, but which will cause this tube to be fired when the next positive pulse occurs in the conductor 321.

As before stated, the positive impulse surges from amplifier tube 302 through conductor 321 will approach 180 volts as a maximum in a positive sense, which positive surges are impressed through the capacitors 371 to 380 inclusive and 382, each of .00001 microfarad capacity, to the grids of the digit-representing tubes and the transfer tube. By choosing proper values for the capacitors as 376 and resistors as 688, the amount of the potential change of the grids can be regulated as well as the speed of response of the accumulator. The potential change of the grids, because of the values used, will not be sufficient to cause the non-conductive tubes to fire whose grids are at 110 volts negative with respect to ground and 78 volts negative with respect to their cathodes. The digit-representing tube having a value of one higher than the conducting digit-representing tube, in the instant case the "6" digit-representing tube, will have its grid at a potential of 57 volts negative with respect to ground, due to the change in potential of point 452 when the "5" digit-representing tube is conductive, and as the cathode 521 of the "6" digit-representing tube is at a potential of 32 volts negative with respect to ground, the grid 522 will be but 25 volts negative with respect to the cathode, and the potential surge on conductor 321 will cause a sufficient potential change to the grid to cause the "6" digit-representing tube to fire and be conductive.

When the "6" digit-representing tube is conductive, the potential of its cathode 521, due to the high resistance in the cathode circuit, will immediately assume a positive potential of 85 volts, causing a surge of 117 volts in the positive sense in potential of conductor 523, which links the tubes of a denominational order in an endless operative chain. The .005-microfarad capacitors numbered 555 to 564 inclusive, one of which is positioned in conductor 523 between each two cathodes, allow the cathode potential surge to be transmitted along the conductor. As cathode 393 of the "5" digit-representing tube, still conducting, is at 85 volts positive potential, the added positive surge of 117 volts will cause the positive potential of the cathode 393 to be greater than the 100-volt positive plate 396, and tube "5" will be extinguished, the grid will resume control, and point 452 will resume its normal 110-volt negative potential. The 5,000-ohm resistors 565 to 574 inclusive, introduced between each two of the cathode condensers on conductor 523, eliminate extra potential surges in the conductor 523 by dampening any tendency to oscillate.

As contact 525 (Fig. 9B) in commutator 526 is of the same potential as point 452, which has changed from 57 volts negative to nearly 110 volts negative because the tube "5" has been extinguished, the 110-volt negative potential is impressed on grid 478 of the stepping magnet control tube 472, making the grid 478 have a negative bias of 23 volts over the 87-volt negative cathode 471, rendering the tube 472 non-conductive, which, causing grid 479 to return to ground potential and lose control, allows current to flow in the stepping magnet energizing tube 454, energizing magnet 503. The stepping pawl 532 (see Fig. 4), being made potentially effective by the attraction of the armature 509 to the magnet 503, which movement of the armature 509 toward the magnet also breaks the circuit energizing the magnet 503 by opening switch 508, is kinetically effective as it is drawn to normal position by return spring 531, thus moving the common axle 536 (Figs. 4, 9A, 9B, and 9C) of the sensing arms 565, 397, and 384 one step, to position "6" on commutator 526, where wiper arm 397 senses, through conductor 532, the point 515, which is 57 volts negative because the "6" digit-representing tube 337 is conductive. This results in grid 478 (Fig. 9A) of the stepping magnet control tube 472 becoming ineffective to block the plate current, which current causes the grid 479 to assume a negative potential and prevent the refiring of the stepping magnet energizing tube 454. Thus, when wiper arm 505 reaches the "6" contact, no current is supplied to the stepping magnet 503, and the indicator comes to rest at "6," which represents the conductive tube. It will be understood from this that the sensing means will continue the exploring operation until a contact of 57 volts negative potential is found by wiper arm 397, indicating a conductive tube. In case none of the tubes are conductive, the indicator would show that fact by never coming to rest.

The tens denominational order is shown in Figs. 10A, 10B, and 10C and is similar in operation to the units denominational order described above.

Certain electrical supply lines described in connection with Figs. 9A, 9B, and 9C are common to Figs. 10A, 10B, and 10C. Figs. 9A and 10A contain a common connection 201 for the 135-volt positive conductor energizing the stepping relay; a common connection 202 for the 170-volt positive conductor restoring the indicated amount into the accumulator; a connection 203 to the digit-representing tube plate supply conductor; and a connection 533 for the grid impulse conductor for the "00" tube for clearing operations.

Electric conductors common to Figs. 9C and 10C are the transfer impulse conductor identified by the common connection 343; the transfer tube plate supply identified by the common connection 204; and the 175-volt negative supply conductor identified by the connection 205.

Digit-representing tubes corresponding to the values "00," "10," "20," "30," "40," "50," "60," "70," "80," and "90" are shown at 456, 457, 458, 459, 461, 462, 463, 464, 465, and 466 and are connected by circuits to cause them to be fired one at a time in succession, as were the digit-representing tubes of the units denominational order.

A transfer tube 467, which operates exactly like the transfer tube 341, will cause an impulse to be sent to the next higher order—in the instant showing, the overflow order.

The stepping magnet 450 will operate the wiper arms 481, 482, and 483 of the indicating means of the tens denominational order in the same manner as the stepping magnet 503 of the units denominational order. Wiper arm 482 will sense for a conductive digit-representing tube to control the operation of the stepping magnet control tube 468 and stepping magnet energizing tube 469.

The connector 202 will connect wiper arm 483 to the terminal 580 to enable the restoration of digit values into this order of the accumulator at the same time and in the same manner as that explained above in connection with wiper arm 384 of the units denominational order.

The accumulator denominational banks are unitary and as many may be added in series as are desired, either to be operated by an equivalent denominational bank and the transfer device of the adjoining bank or by the transfer device of the adjoining bank alone.

*Clearing*

When the main switch 90 is opened and all values are erased from the accumulator, the accumulator will not assume a zero or cleared condition when the main switch 90 is closed again, but the values erased from the accumulator will be restored, as explained earlier herein. To clear the accumulator of any value standing thereon and to enable further entries to be made therein, all digit-representing tubes must be rendered non-conductive and the "0" digit-representing tube in each order must be rendered conductive.

With the "6" digit-representing tube 337 conductive and the wiper arms 384, 397, and 505 at rest on the "6" contacts of their respective commutators, the key switch 401 is operated after switch 427 has shifted. The 170-volt positive source of potential is connected through closed main switch 90 (Fig. 8), conductor 447, key switch 401, contact 455, conductor 433, switch 426, contact 429, and conductor 434 to terminal 99. The terminal 99 (Fig. 9A) is connected through the winding of resetting control magnet 541 to ground.

When the magnet 541 is energized, it draws its armature 543 upwardly, first closing switches 544, 545, 546, and 547 and later opening switch 346. When switches 546 and 547 close, the conductor 530 and the connection 533 (see also Fig. 10A), leading to the grid 534 of the zero tube of the tens bank designated "00" and the conductor 548 leading to the grid 529 of the zero tube of the units bank designated "0," are connected with the 100-volt positive conductor 323 and immediately thereafter, on further upward motion of armature 543, switch 346 is opened, removing the plate potential of all the tubes from "0" through "9" and "00" through "99," thus extinguishing all of said tubes. The switch 545 represents the means by which the overflow or hundreds bank "zero" tube grid is energized, although the circuits of that bank are not shown in the drawings. On the return movement of the armature 543 (Fig. 9A) to normal, when key switch 401 (Fig. 8) is released, switch 346 (Fig. 9A) first closes to supply the plate potential to the digit tubes, and, before switch 547 opens, point 549, which point 549 is connected through a resistor 552 and conductor 550 to point 518, at the "9" end of the accumulator (Fig. 9C), which point 518 is at 110-volt negative potential, is still subjected to the 100-volt positive potential, which results in point 549 becoming about 17 volts negative, lying, as it does, between resistor 551 of 500,000 ohms and resistor 552 of 400,000 ohms. The cathode 553 of the "0" tube, being 32 volts negative by being connected through resistor 350 of 25,000 ohms to ground and through resistors 253 and 254 of 60,000 ohms and 50,000 ohms respectively to the 175-volt negative conductor 309, and the grid 529 being 17 volts negative, the "0" digit-representing tube fires. Continued movement of the armature 543 to home position opens the switches 547, 546, 545, and 544. Switches 546 and 545 supply the grid voltage for firing the zero digit-representing tubes in the tens and the overflow or hundreds denominations of the accumulator, respectively. Switch 544, connecting the 100-volt conductor 323 to ground through resistor 542 of 2,500 ohms, holds the load in the 100-volt positive conductor as the plate voltages are cut off, thus tending to keep the voltage in said conductor from fluctuating. As the zero tubes in all the accumulator banks are thus fired, the accumulator as a whole is cleared of data. Points in each bank of the accumulator corresponding to point 511 change in voltage from 110 volts negative to 57 volts negative, causing the respective sensing unit wipers to stop on the "zero" contacts and position the associated indicators so that the zeros are displayed.

*Transfer of denominational carry-overs*

Whenever, in an operation of the accumulator, a "9" digit-representing tube has been fired and is conductive, it conditions the "0" digit-representing tube and the transfer tube so that the next impulse to that order of the accumulator will cause the "0" digit-representing tube and the transfer tube to fire, the firing of the "0" tube causing the "9" tube to be extinguished and the firing of the transfer tube causing an impulse to be sent to the next higher denominational order.

When the "9" digit-representing tube 340 (Fig. 9C) is conductive, point 518 will have a negative potential of 57 volts, as heretofore explained in connection with the points 452 and 515 when the digit-representing tubes "5" and "6" were conductive. The potential of point 518 is conveyed through conductor 550 (Figs. 9A, 9B, and 9C) and resistor 552 to point 549, to which the grid 529 of the "0" digit-representing tube 331 is connected, and to the point 488 (Fig. 9C), to which the grid of the transfer tube is connected. When the next impulse is impressed on conductor 321, both the "0" digit-representing tube 331 and the transfer tube 341, being primed, will be fired. The "0" digit-representing tube is fired as is any of the number tubes. The 117-volt rise in cathode potential of the "0" digit-representing tube is transmitted to the cathode of the still-conducting "9" digit-representing tube by the common conductor 523 through capacitor 559 and resistor 574, thus extinguishing the "9" digit-representing tube. The potential of the cathode 489 of the transfer tube 341 is taken from point 490, which point is connected to ground through resistor 460 of 50,000 ohms and is connected to the 175-volt negative conductor through resistor 491 of 250,000 ohms, making point 490, when transfer tube 341 is not conducting, at a potential of about 28 volts negative. As the impulse comes to the grid 492, through capacitor 382 of .00001 microfarad, the transfer tube is fired and causes the cathode potential to rise to 155 volts positive as the potential of the plate of the transfer tube is 170 volts positive. The resultant positive potential surge of 183 volts is conducted over the conductor 343 to the impulse conductor 821 (Figs. 10A, 10B, and 10C) of the tens denominational bank of the accumulator and acts in that bank of the accumulator, just as though an impulse had come from the tens denomination differential actuator, to "fire" the digit-representing tube which is prepared in that denominational order. In this way, denominational carry-overs are made from one denominational bank to another. The cathode current in the conductive transfer tube is relatively large at first, due to the charging of the distributed capacity and inductance of the conductors, the cathode to heater filament capacity of tube 341 and the capacitors 718, 721, 726, 731, 736, 743, 748, 753, 758, 763, and 767 of .00001 microfarad each in the tens denominational order. When these capacitors are charged, the cathode current of transfer tube 341 (Fig. 9C) becomes very small due to the 50,000-ohm resistor 460 and the 250,000-ohm resistor 491. During the initial high current from the cathode to the plate of the transfer tube 341, the gas therein is ionized, but momentarily becomes deionized as the cathode reaches a potential positive peak at or above the plate potential, due to inductance phenomena in the cathode circuit as explained in connection with the self-extinguishing relay tube. At the time the cathode 489 is at the potential of the plate, current ceases to flow, and the grid, having resumed its negative 110-volt potential from point 518 (Fig. 9C) through resistors 441 and 381 of 100,000 ohms each, will keep the cathode current from again flowing as the potential difference increases between the cathode and the plate. The transfer tube is thus self-extinguishing and is ready to be prepared for another operation when the "9" digit-representing tube is again rendered conductive. Such self-extinguishing phenomena are prevented in the digit-representing tubes by the use of lower cathode resistors and by the resistors as 565 heretofore described placed in series with the capacitors as 560 connecting each two adjacent cathodes. Therefore, presuming that in the tens denominational order of the accumulator the "00" digit-representing tube is conductive before the transfer tube has fired, the "10" digit-representing tube 457 will be fired by the impulse from the transfer tube of the units denominational order. If the "90" digit-representing tube 466 of the tens denominational order of the accumulator had been conductive, and an impulse came over transfer conductor 343 from the units to the tens denominational order, the "00" digit-representing tube 456 and the "transfer" tube of the tens denominational order would both fire, entering the carry-over of one into the hundreds denominationl order, both the transfer tubes in the units and the tens denominational orders then extinguishing themselves.

It will now be apparent that the time delay element composed of a resistor and a capacitor in parallel connected to the grid of the starting tube of each differential actuator bank is used to withhold the firing of a denominational entry until a possible transfer has been made into that order of the accumulator, and why, in the alternative embodiment, by the alternative method of adding into the higher denominations first, there can be no interference of the entered data impulses and the transfer impulses.

*The stepping relays*

Although not novel, the mechanical elements constituting the driving means for the sensing wiper arms and the indicator wheel coupled thereto will be described with reference to Figs. 4 and 5. Fig. 4 is a side elevation of the sensing and indicating mechanism for the units denominational order. Reference numerals on Figs. 4 and 5 in general correspond to the same elements as bear like numbers in the diagrammatic showings in Figs. 9A, 9B, and 9C.

On a vertical frame plate 527 (Fig. 4) is secured a horizontal plate 528 to which is attached the stepping magnet 503 (see also Fig. 9A) for operating an armature 509 fulcrumed on a projection 539 of an angle plate 537 secured to plate 528, the lower extending arm of said angle plate 537 having screwed thereto a spring anchor 538 for return spring 531, the other end of which spring is attached at point 593 to a lower projecting part of spring anchor 540 attached to armature 509, so that the armature is normally held away from the magnet 503. A lower projecting arm 575 of said armature, bearing against stop 576, limits the movement of the armature as it is pulled away from the magnet under urge of spring 531. Attached to plate 527 is a switch block 577 holding the contacts constituting switch 508. On movement of the armature toward the magnet 503, which magnet is energized through normally closed switch 508, the knob 578 opens switch 508, deenergizing the magnet 503, allowing spring 531 to return the armature to normal. Pawl 532 attached to the arm 575 cooperates with a ratchet 535 secured to an axle 536 journaled in plate 527. The other end of axle 536 is journaled in plate 583 attached to plate 528. As the armature moves toward the stepping magnet, the pawl is retracted one tooth and on the return of the armature to normal, under the influence of spring 531, rotates the ratchet and axle corresponding to the angle of one tooth. The ratchet has 20 teeth requiring 20 movements of the armature for its complete rotation. Secured to the axle 536 are the three wiper arms 505, 397, and 384, each of which has two arms which (see also Figs. 5, 9A, 9B, and 9C) are adapted by one arm or another to contact one of ten commutator contacts associated therewith whenever the armature is in normal position. Each of the wiper arms is connected by a wiper brush as 591 (Fig. 5) to a conductor to complete an electric circuit when the wiper arm engages one of the contacts of its related commutator. Thus, as axle 536 is rotated step by step, the wiper arms make a contact at the completion of each step. A spring member 520 engages the ratchet 535 to prevent reverse movement thereof. Means heretofore described is provided for stopping the energizing current of the stepping magnet whenever arm 397 wipes a contact of certain potential. The ten contacts stand for the ten decimal digits. Also attached to axle 536 (Figs. 4 and 5) is a pinion 584, which drives, by one rotation, a second pinion 585 two rotations. Pinion 585, secured on frame-supported axle 586, has secured to it a symbol wheel 587 bearing the decimal digits. For each contact which is wiped by arm 397 and stopped thereon because of a conductive tube, the corresponding symbol is positioned in front of a viewing aperture 588 to indicate the accumulated data visually.

There is one of the sensing and indicating units for each bank of the accumulator and they may be placed side by side, as shown in Fig. 1, so as to render the denominational indications readable in the correct contextual order.

Operation

Assuming that the described machine is in a deenergized condition due to main switch 90 being open and that it is desired to make an entry of data into a cleared accumulator, the operator first closes main switch 90, waits for the heater elements of the tubes to warm, and then operates key switch 401, allowing it to be returned to normal by its spring. Signal light 510, by lighting, indicates that the machine is operative. At this point, if the signal light has lighted, the indicator and the accumulator contain the same data. If the accumulator is not in a cleared or zeroized condition, a second operation of key switch 401 will clear it and render the zero digit-representing tubes in each denominational order conductive. The digit keys are then depressed and starting switch 100 is depressed to render the differential actuator operative to enter the selected number data into the accumulator. It is to be noted that, if the key switch 401 were not operated a second time and data were entered by means of the digit keys and starting switch 100, the amount set on the digit keys would be added to that last standing on the indicator. At any time during a series of entries of data, it is possible to disable the indicator by opening the non-indicate switch 423, which will retain in the indicator the sum then accumulated. Ensuing entries of data will not change the setting of the indicator until the non-indicate switch 423 is again closed, at which time the indicator will be operated to show the new total. At any time during the operation of the machine, key switch 401 may be operated to reset the accumulator to zero. On completion of a series of entries, main switch 90 may be opened, leaving the accumulated sum on the indicator to be used in the future or to be cleared on the next operation of the machine. By resetting the accumulator before the main switch 90 is opened, the indicator will be left at zero, and in putting the machine into operation again in a cleared condition, the main switch 90 has to be closed and key switch 401 operated only once.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In combination, an electronic counting device including a plurality of digit representing electron tubes each having at least an anode, a cathode, and a control element, which device is actuated by excursions of potential commonly applied to the control elements of said tubes; an input conductor for said counting device; an actuator for said counting device including a gaseous electron tube having at least an anode connected directly to a constant anode potential source, a cathode connected to the input conductor and also connected through a resistance and capacitance in parallel to a constant source of cathode potential, and a control element normally biased to prevent conduction in the said actuator tube; means coupling the control elements of the counting device tubes each, electrostatically, to the input conductor and each, conductively, through a resistance to a source of biasing potential, the circuit elements of resistance, capacitance, and distributed inductance of the actuator tube, the input conductor, and the digit tube couplings thereto being of such value that commencement of conduction in the actuator tube causes its own extinguishment by reason of the ensuing oscillatory rise in potential of its cathode; and selectively operable means acting upon the control element of the actuator tube to cause said actuator tube to become conducting a selected number of times.

2. In combination, a counter of electric impulses including a plurality of digit representing electron tubes each having at least an anode, a cathode, and a control element potentially biased through a resistance, which counter is actuated by excursions of potential commonly applied to the control elements of said tubes by being electrostatically connected to an input conductor; an actuator for said counter including a gaseous electron tube having at least an anode, a cathode and a control element; means to supply anode-cathode potential to said actuator tube at all times sufficient to maintain conduction therein, said cathode portion of the supply means including a cathode resistor shunted by a capacitor and said anode being connected directly to the potential supply source; means supplying biasing potential to the control element of the actuator tube to normally prevent conduction therein; a conductive connection between the cathode of the actuator-tube and the input conductor, the circuit elements of resistance, capacitance, and distributed inductance in the recited circuits being of such value that the actuator tube will be extinguished by its own act of becoming conducting by reason of an oscillatory rise of its cathode potential; and means to impress a firing potential impulse on the control element of the actuator tube a selected number of times to cause it to conduct.

3. In combination, a source of positive electric potential impulses to be counted; a counter of electric potential impulses including a group of gaseous electron tubes each having at least an anode, a cathode, and a control member, said tubes being connected in a circuit for step-by-step endless chain operation by excursions of potential commonly applied thereto electrostatically upon their control members, said circuit including control element bias potential supply conductors having resistance; a capacitor coupling the control member of each tube of the counter to a common input conductor, upon which conductor operating excursions of potential may be impressed to cause a step of operation of the counter at each excursion; and a gaseous triode electron tube relay having an anode, a cathode, and a control grid, said grid being normally biased so as to prevent a discharge between the anode and the cathode and being connected to the source of impulses, and the cathode of said tube being connected to the input conductor and having a capacitor and resistance in parallel connecting the cathode to a source of operating potential; and means connecting the anode directly with a source of operating potential, whereby the positive potential impulses from said source cause the relay tube to discharge and self-extinguish by reason of an oscillatory rise in its cathode potential so as to relay them to the input conductor.

ROBERT E. MUMMA.